United States Patent
Lim et al.

(10) Patent No.: US 12,278,783 B2
(45) Date of Patent: Apr. 15, 2025

(54) MAXIMUM SENSITIVITY DEGRADATION

(71) Applicant: LG ELECTRONICS INC., Seoul (KR)

(72) Inventors: Suhwan Lim, Seoul (KR); Jaehyuk Jang, Seoul (KR); Yoonoh Yang, Seoul (KR); Sangwook Lee, Seoul (KR); Jinyup Hwang, Seoul (KR); Jinwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 296 days.

(21) Appl. No.: 17/575,122

(22) Filed: Jan. 13, 2022

(65) Prior Publication Data

US 2022/0224460 A1 Jul. 14, 2022

(30) Foreign Application Priority Data

Jan. 13, 2021 (KR) .................. 10-2021-0004861

(51) Int. Cl.
*H04L 5/00* (2006.01)
(52) U.S. Cl.
CPC .............. *H04L 5/006* (2013.01); *H04L 5/001* (2013.01); *H04L 5/0048* (2013.01)
(58) Field of Classification Search
CPC ....... H04L 5/001; H04L 5/0048; H04L 5/006; H04L 27/2601; H04B 1/525; Y02D 30/70
USPC ...................................................... 455/452.1
See application file for complete search history.

(56) References Cited

U.S. PATENT DOCUMENTS

| | | | |
|---|---|---|---|
| 2017/0054535 A1 | 2/2017 | Lim et al. | |
| 2019/0081657 A1* | 3/2019 | Zeng ................... | H04W 52/146 |
| 2019/0327693 A1* | 10/2019 | Rahman ............... | H04W 52/42 |
| 2020/0045720 A1* | 2/2020 | Abdel Shahid ... | H04W 72/1268 |
| 2020/0084780 A1* | 3/2020 | Wiatrowski .......... | H04W 16/14 |
| 2022/0060999 A1* | 2/2022 | Oh ....................... | H04W 52/383 |
| 2022/0225080 A1* | 7/2022 | Ng ........................ | H04W 76/11 |

FOREIGN PATENT DOCUMENTS

WO 2020197129 A1 10/2020

OTHER PUBLICATIONS

Dushmantha et al.; IEEE; Aug. 2020; 1 page (Year: 2020).*

(Continued)

*Primary Examiner* — Hirdepal Singh
(74) *Attorney, Agent, or Firm* — BRYAN CAVE LEIGHTON PAISNER LLP

(57) ABSTRACT

There is provided a UE in a wireless communication system, the UE comprising: at least one transceiver; at least one processor configured to use CA based on two NR operating bands; and at least one computer memory operably connectable to the at least one processor and storing instructions that, based on being executed by the at least one processor, perform operations comprising: transmitting, via the at least one transceiver, an uplink signal via one NR operating band among the two NR operating bands; and receiving, via the at least one transceiver, a downlink signal on other NR operating band, different from the one NR operating band, among the two NR operating bands.

8 Claims, 18 Drawing Sheets

(56) References Cited

OTHER PUBLICATIONS

"3rd Generation Partnership Project; Technical Specification Group Radio Access Networks; Dual Connectivity (DC) of x bands (x=1, 2, 3, 4) LTE inter-band CA (x DL/1 UL) and 2 bands NR Inter-band CA (2 DL/1 UL) band combinations (Release 17)", 3GPP TR 37.717-11-21 V0.1.0 (Sep. 2020), Sep. 7, 2020.
"3rd Generation Partnership Project; Technical Specification Group Radio Access Network; NR; User Equipment (UE) radio transmission and reception; Part 3: Range 1 and Range 2 Interworking operation with other radios (Release 17)", 3GPP TS 38.101-3 V17.0.0 (Dec. 2020), Jan. 12, 2021.
"3rd Generation Partnership Project; Technical Specification Group Radio Access Network; NR; User Equipment (UE) conformance specification; Radio transmission and reception; Part 3: Range 1and Range 2 Interworking operation with other radios (Release 16)", 3GPP TS 38.521-3 V16.6.0 (Dec. 2020), Jan. 8, 2021.
3GPP TS 38.101-3 V16.5.0.
3rd Generation Partnership Project; Technical Specification Group Radio Access Network, User Equipment (UE) radio transmission and reception; Part 1: Range 1 Standalone (Release 17), 3GPP TS 38.101-1 V17.0.0 38 pages, Dec. 2020 369 pages.
Ericsson "Re-organization of EN-DC refsens test cases," 3GPP TSG-RAN Meeting #88-e, R5-204932, 93 pages, Aug. 2020.

* cited by examiner

MAXIMUM SENSITIVITY DEGRADATION

CROSS-REFERENCE TO RELATED APPLICATIONS

Pursuant to 35 U.S.C. § 119 (a), this application claims the benefit of Korean Patent Application No. 10-2021-0004861, filed on Jan. 13, 2021, the contents of which are all hereby incorporated by reference herein in their entirety.

Technical Field

The present disclosure relates to mobile communication.

Background

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Conventionally, for power class 2 User Equipment (UE), the impact of self interference, such as harmonics and/or Intermodulation Distortion (IMD), on some E-UTRA NR Dual Connectivity (EN-DC) band combinations and on some inter-band Carrier Aggregation (CA) band combinations has not been analyzed. The total power boosting impact with 3 dB shall be analyzed in the receiver side by dual uplink transmission since the IMD source also will be increased by the 3 dB boosting each transmitted carrier. Herein, "total power boosting impact with 3 dB" occurs because maximum output power of the power class 2 is 3 dB bigger than maximum outpout power of conventional power class 3. However, the Maximum Sensitivity Degradation (MSD) values have not been discussed for these cases in previous 3GPP work.

Also, for power class 2 UE, the impact of cross band isolations, which means interference on Rx(reception) band due to small frequency interval between Tx(Transmission) carrier/frequency in X band (operating band X) and the Rx carrier/frequency in Y band (operating band Y), on some inter-band EN-DC band combinations and on some inter-band NR CA band combinations has not been analyzed. Thus, Maximum Sensitivity Degradation (MSD) values have not been discussed for these cases.

SUMMARY

Accordingly, a disclosure of the present specification has been made in an effort to solve the aforementioned problem.

Accordingly, a disclosure of the present specification has been made in an effort to solve the aforementioned problem.

In accordance with an embodiment of the present disclosure, a disclosure of the present specification provides a UE in a wireless communication system, the UE comprising: at least one transceiver; at least one processor; and at least one computer memory operably connectable to the at least one processor and storing instructions that, based on being executed by the at least one processor, perform operations comprising: transmitting, via the at least one transceiver, an uplink signal via one NR operating band among the two NR operating bands; and receiving, via the at least one transceiver, a downlink signal on other NR operating band, different from the one NR operating band, among the two NR operating bands.

In accordance with an embodiment of the present disclosure, a disclosure of the present specification provides a method for performing communication, the method performed by a UE. The method comprises: transmitting an uplink signal via one New Radio (NR) operating band among two NR operating bands; receiving a downlink signal on other NR operating band, different from the one NR operating band, among the two NR operating bands.

In accordance with an embodiment of the present disclosure, a disclosure of the present specification provides a wireless device operating in a wireless communication system, the wireless device comprising: at least processor configured to use Carrier Aggregation (CA) based on two New Radio (NR) operating bands, at least one computer memory operably connectable to the at least one processor, wherein the at least one processor is configured to perform operations comprising: generating an uplink signal via one NR operating band among the two NR operating bands; and identifying a downlink signal on other NR operating band, different from the one NR operating band, among the two NR operating bands.

In accordance with an embodiment of the present disclosure, a disclosure of the present specification provides At least one computer readable medium (CRM) storing instructions that, based on being executed by at least one processor, perform operations comprising: generating an uplink signal via one New Radio (NR) operating band among two NR operating bands, identifying a downlink signal on other NR operating band, different from the one NR operating band, among the two NR operating bands.

In accordance with an embodiment of the present disclosure, a disclosure of the present specification provides a UE in a wireless communication system, the UE comprising: at least one transceiver; at least one processor; and at least one computer memory operably connectable to the at least one processor and storing instructions that, based on being executed by the at least one processor, perform operations comprising: transmitting, via the at least one transceiver, an uplink signal via the one NR operating band; and receiving, via the at least one transceiver, a downlink signal via the one E-UTRA operating band.

In accordance with an embodiment of the present disclosure, a disclosure of the present specification provides a method for performing communication, the method performed by a UE. The method comprises: transmitting an uplink signal via one New Radio (NR) operating band; and receiving a downlink signal via the one E-UTRA operating band.

According to a disclosure of the present disclosure, the above problem of the related art is solved.

For example, the impact of harmonics, IMD, and/or cross band isolations on some EN-DC band combinations or some inter-band CA band combinations are analyzed and the MSD are determined.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION OF THE EMBODIMENTS

Figure 1:
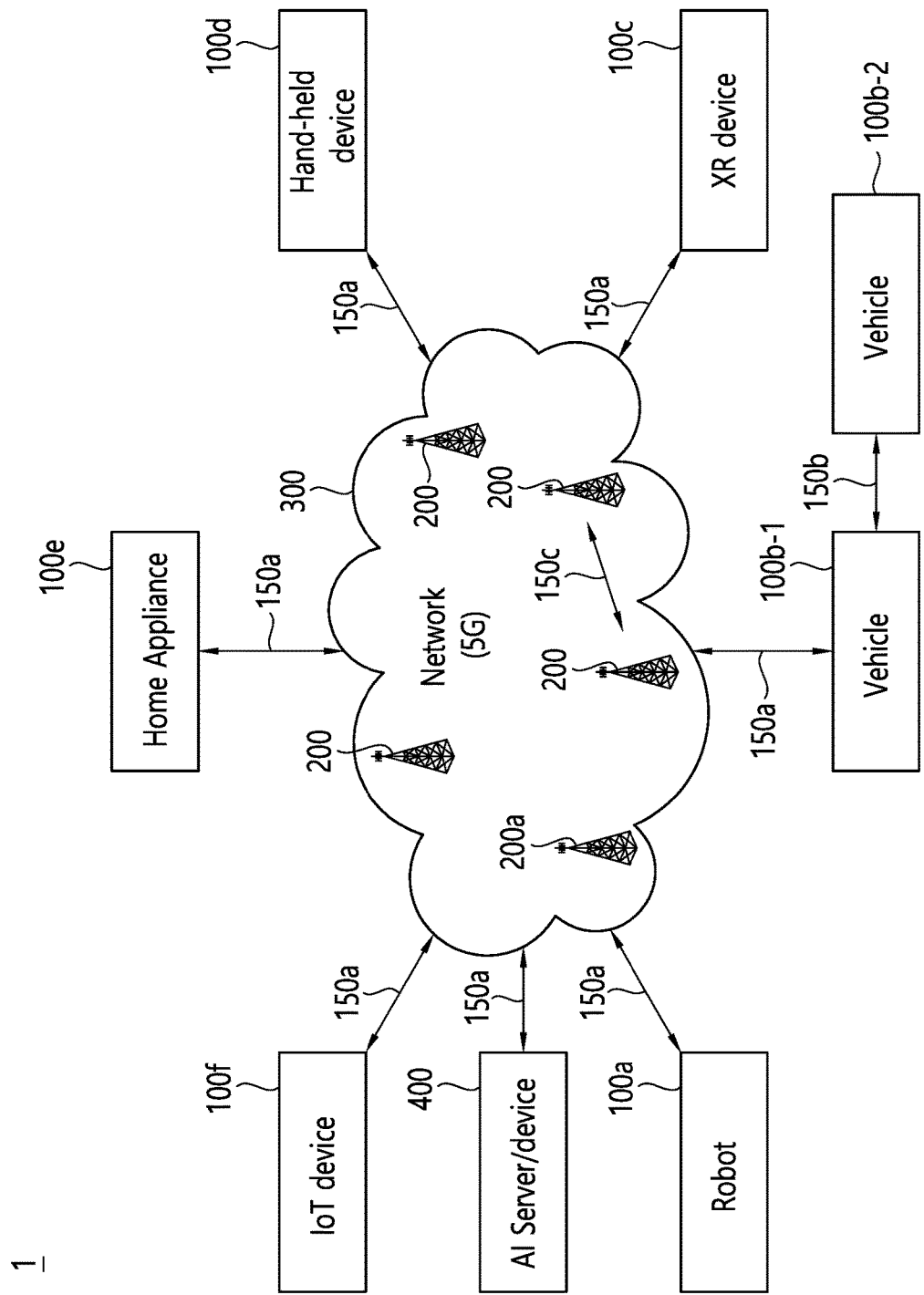
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with re-constructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
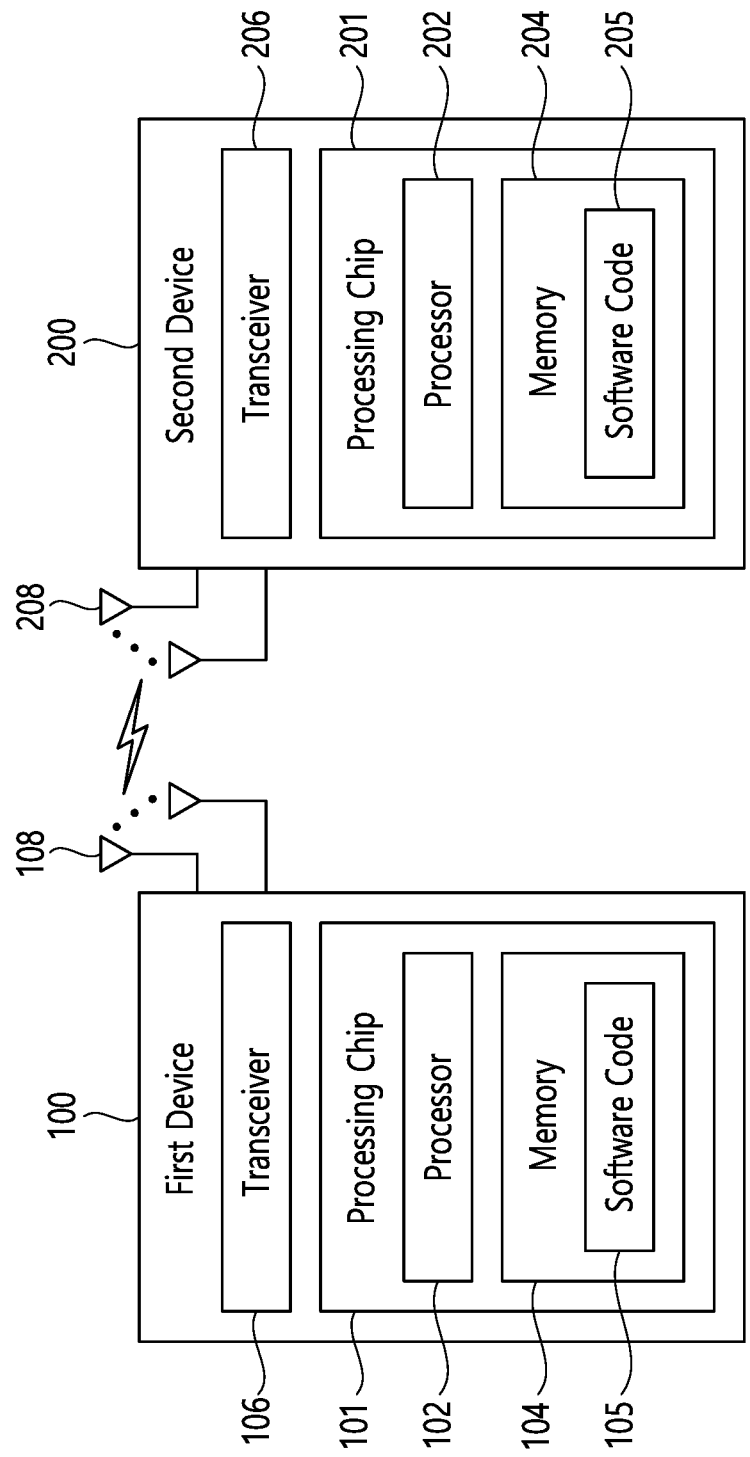
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
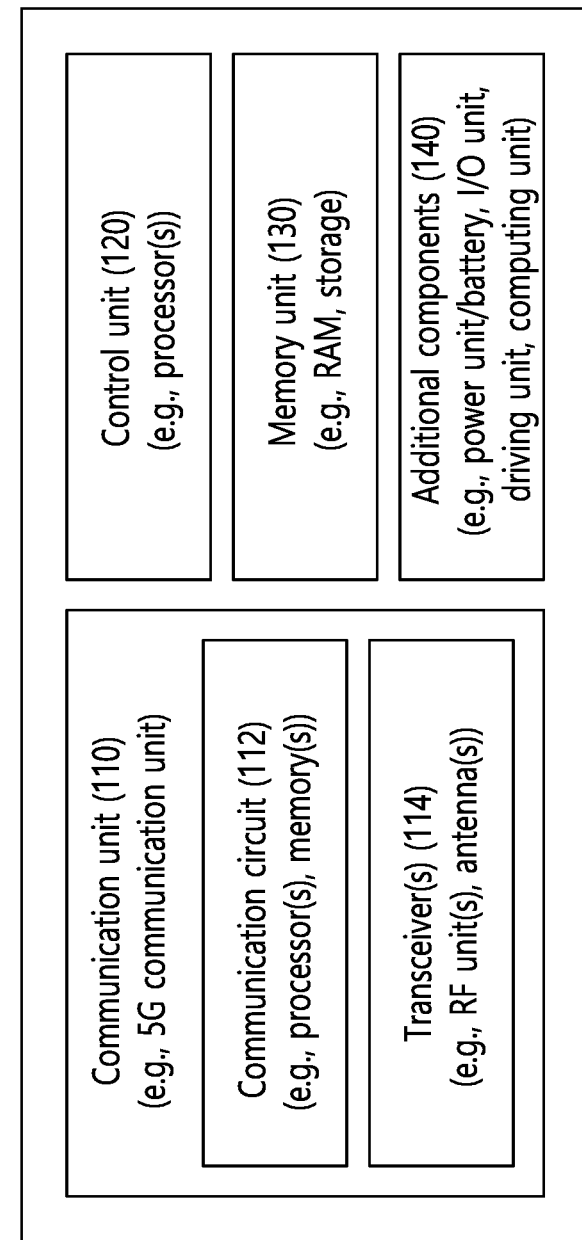
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

<Dual Connectivity (DC)>

Recently, a scheme for simultaneously connecting UE to different base stations, for example, a macro cell base station and a small cell base station, is being studied. This is called dual connectivity (DC).

For example, when DC is configured in E-UTRA, the following exemplary description may be applied.

In DC, the eNodeB for the primary cell (PCell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (PCell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Figure 4A:
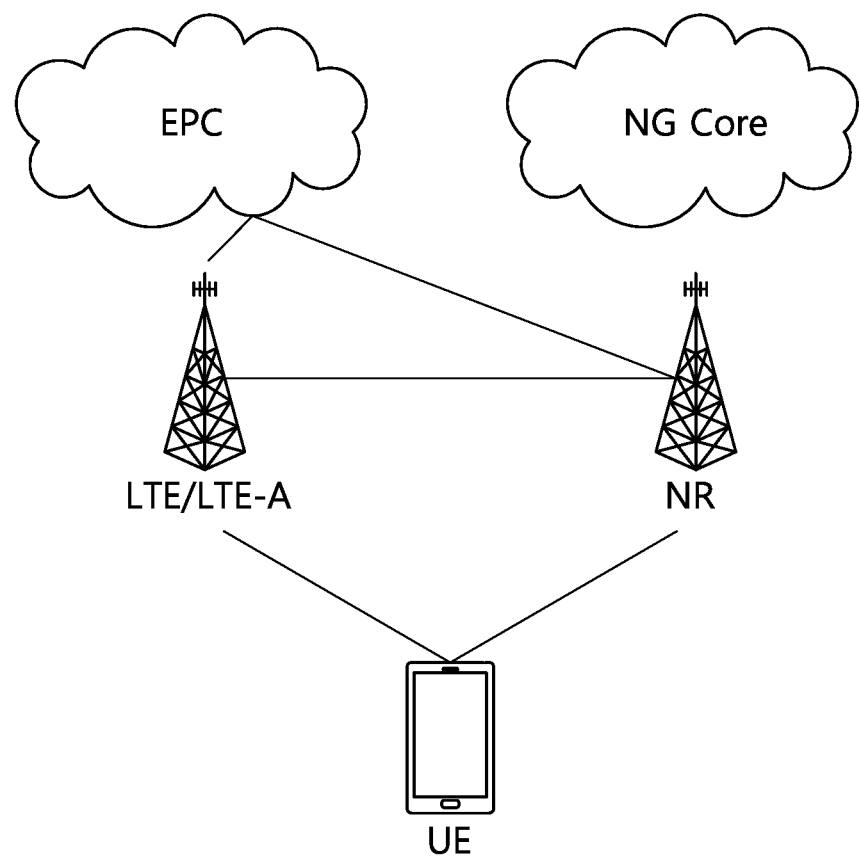
FIGS. 4A to 4C are diagrams illustrating exemplary architecture for a next-generation mobile communication service.
Figure 4B:
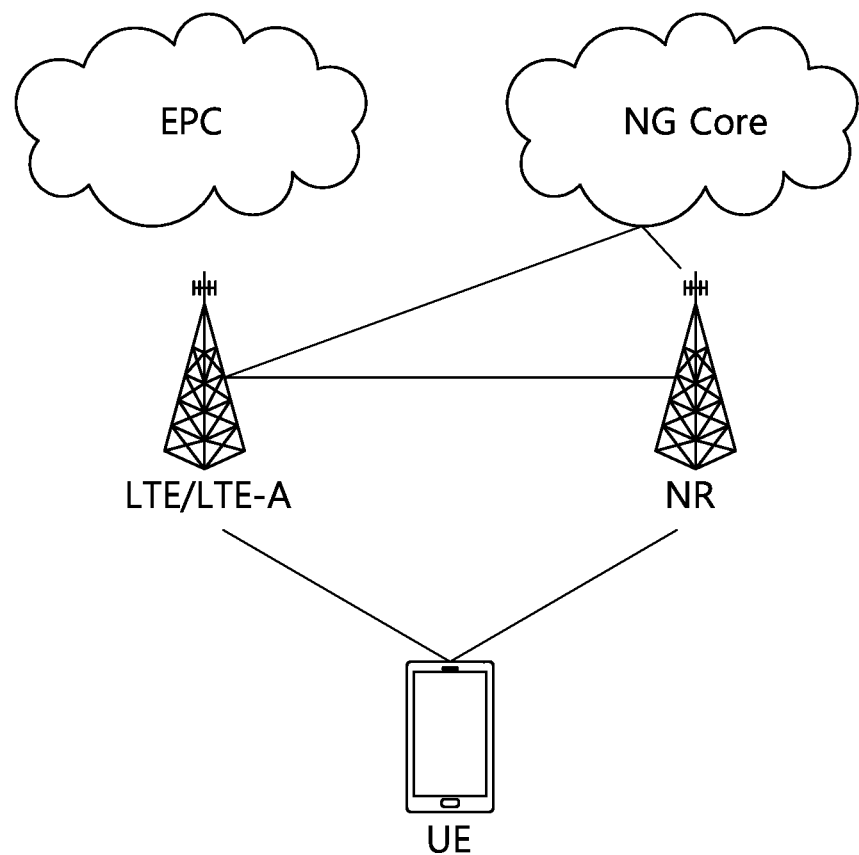
Figure 4C:
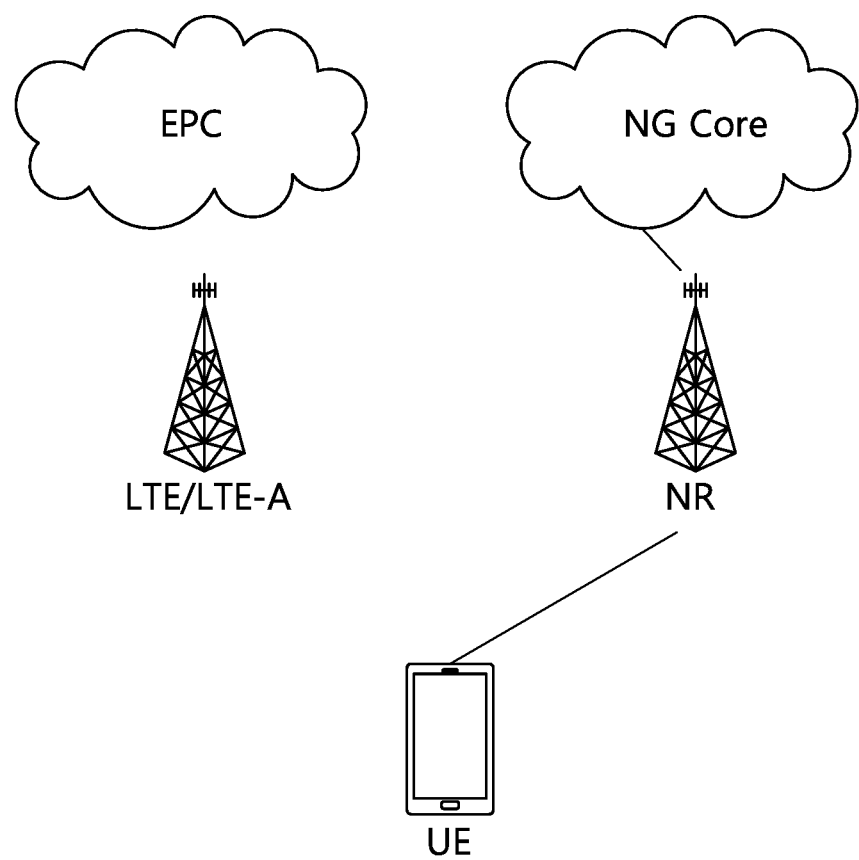

FIGS. 4A to 4C are diagrams illustrating exemplary architecture for a next-generation mobile communication service.

Referring to FIG. 4A, a UE is connected in dual connectivity (DC) with an LTE/LTE-A cell and a NR cell.

The NR cell is connected with a core network for the legacy fourth-generation mobile communication, that is, an Evolved Packet core (EPC). In example shown in FIG. 4A, the UE is configured with EN-DC(E-UTRA-NR DC). The UE, which is configured with EN-DC, is connected with an E-UTRA (that is, LTE/LTE-A) cell and an NR cell. Here, a PCell in EN-DC may be an E-UTRA (that is, LTE/LTE-A) cell, and a PSCell in EN-DC may be an NR cell.

Referring to FIG. 4B, the LTE/LTE-A cell is connected with a core network for 5th generation mobile communication, that is, a Next Generation (NG) core network, unlike the example in FIG. 4A.

A service based on the architecture shown in FIGS. 4A and 4B is referred to as a non-standalone (NSA) service.

Referring to FIG. 4C, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

Figure 5:
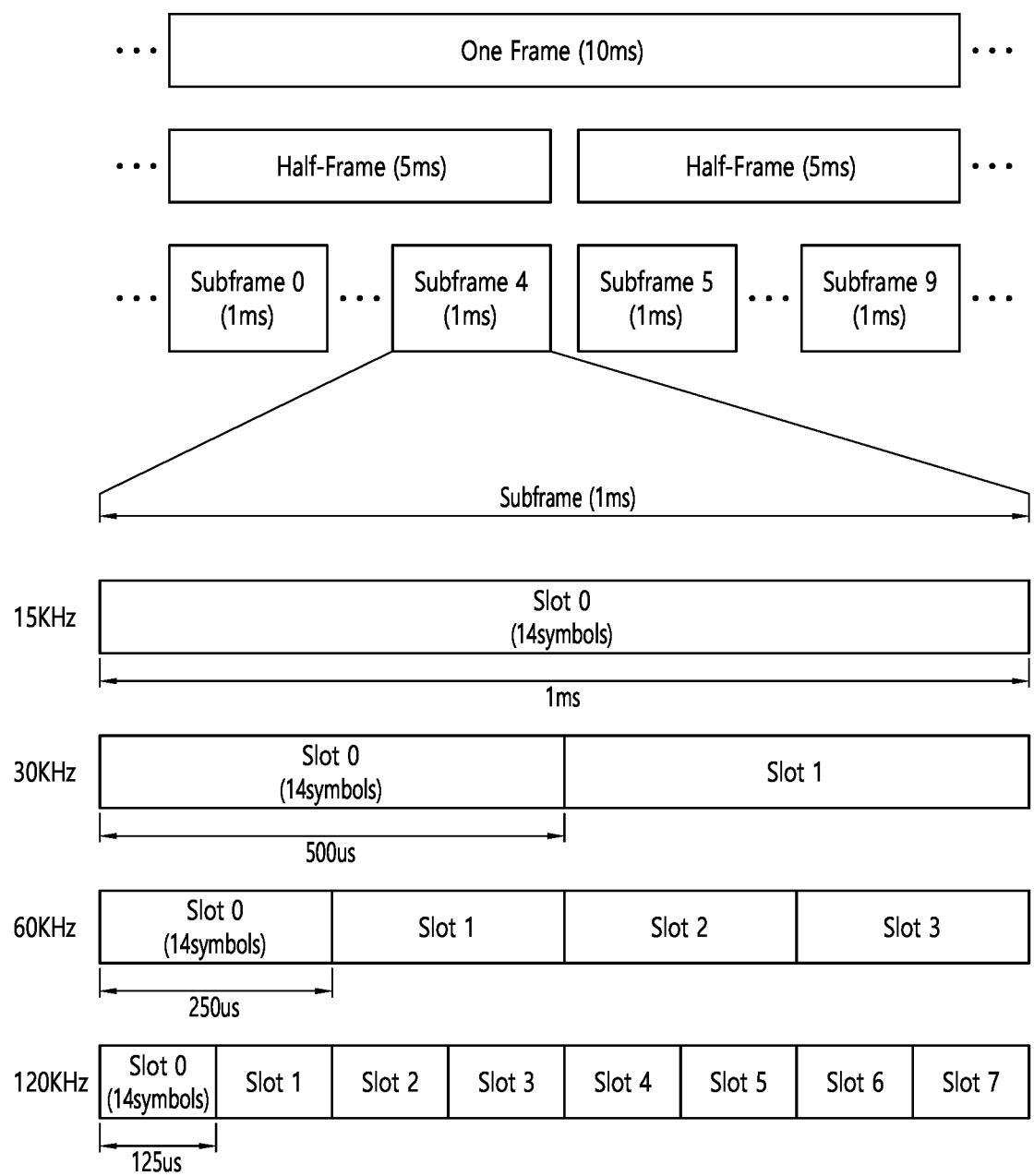
FIG. 5 shows a frame structure in a 3GPP based wireless communication system to which implementations of the present disclosure is applied.

FIG. 5 shows a frame structure in a 3GPP based wireless communication system to which implementations of the present disclosure is applied.

The frame structure shown in FIG. 5 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 5, downlink and uplink transmissions are organized into frames. Each frame has $T_f$, 10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 3

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 4

| u | $N^{slot}_{symb}$ | $N^{frame, u}_{slot}$ | $N^{subframe, u}_{slot}$ |
|---|---|---|---|
| 2 | 12 | 40 | 4 |

<Operating Band in NR>

An operating band shown in Table 5 is a reframing operating band that is transitioned from an operating band of LTE/LTE-A. This operating band is referred to as FR1 band.

TABLE 5

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n13 | 777 MHz-787 MHz | 746 MHz-756 MHz | FDD |
| n14 | 788 MHz-798 MHz | 758 MHz-768 MHz | FDD |
| n18 | 815 MHz-830 MHz | 860 MHz-875 MHz | FDD |
| n20 | 832 MHz-862 MHz | 791 MHz-821 MHz | FDD |
| n24 | 1626.5 MHz-1660.5 MHz | 1525 MHz-1559 MHz | FDD |
| n25 | 1850 MHz-1915 MHz | 1930 MHz-1995 MHz | FDD |
| n26 | 814 MHz-849 MHz | 859 MHz-894 MHz | FDD |
| n28 | 703 MHz-748 MHz | 758 MHz-803 MHz | FDD |
| n29 | N/A | 717 MHz-728 MHz | SDL |
| n30 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n46 | 5150 MHz-5925 MHz | 5150 MHz-5925 MHz | TDD |
| n47 | 5855 MHz-5925 MHz | 5855 MHz-5925 MHz | TDD |
| n48 | 3550 MHz-3700 MHz | 3550 MHz-3700 MHz | TDD |
| n50 | 1432 MHz-1517 MHz | 1432 MHz-1517 MHz | TDD1 |
| n51 | 1427 MHz-1432 MHz | 1427 MHz-1432 MHz | TDD |
| n53 | 2483.5 MHz-2495 MHz | 2483.5 MHz-2495 MHz | TDD |
| n65 | 1920 MHz-2010 MHz | 2110 MHz-2200 MHz | FDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

TABLE 5-continued

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n85 | 698 MHz-716 MHz | 728 MHz-746 MHz | FDD |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD |
| n91 | 832 MHz-862 MHz | 1427 MHz-1432 MHz | FDD |
| n92 | 832 MHz-862 MHz | 1432 MHz-1517 MHz | FDD |
| n93 | 880 MHz-915 MHz | 1427 MHz-1432 MHz | FDD |
| n94 | 880 MHz-915 MHz | 1432 MHz-1517 MHz | FDD |
| n95 | 2010 MHz-2025 MHz | N/A | SUL |
| n96 | 5925 MHz-7125 MHz | 5925 MHz-7125 MHz | TDD |
| n97 | 2300 MHz-2400 MHz | N/A | SUL |
| n98 | 1880 MHz-1920 MHz | N/A | SUL |
| n99 | 1626.5 MHz-1660.5 MHz | N/A | SUL |

The following table shows an NR operating band defined at high frequencies. This operating band is referred to as FR2 band.

TABLE 6

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 39500 MHz-43500 MHz | 39500 MHz-43500 MHz | TDD |
| n260 | 37000 MHz-40000 MHz | 37000 MHz-40000 MHz | TDD |
| n261 | 27500 MHz-28350 MHz | 27500 MHz-28350 MHz | TDD |
| n262 | 47200 MHz-48200 MHz | 47200 MHz-48200 MHz | TDD |

Meanwhile, when the operating band shown in the above table is used, a channel bandwidth is used as shown in the following table. For example, Table 7 shows an example of a maximum value of the cannel bandwidth.

TABLE 7

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 70 MHz $N_{RB}$ | 80 MHz $N_{RB}$ | 90 MHz $N_{RB}$ | 100 MHz $N_{RB}$ |
|---|---|---|---|---|---|---|---|---|---|---|---|---|---|
| 15 | 25 | 52 | 79 | 106 | 133 | 160 | 216 | 270 | N/A | N/A | N/A | N/A | N/A |
| 30 | 11 | 24 | 38 | 51 | 65 | 78 | 106 | 133 | 162 | 189 | 217 | 245 | 273 |
| 60 | N/A | 11 | 18 | 24 | 31 | 38 | 51 | 65 | 79 | 93 | 107 | 121 | 135 |

In the above table, SCS indicates a subcarrier spacing. In the above table, $N_{RB}$ indicates the number of RBs.

Meanwhile, when the operating band shown in the above Table 6 is used, a channel bandwidth is used as shown in the following table 8.

TABLE 8

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N/A |
| 120 | 32 | 66 | 132 | 264 |

In NR, E-UTRA (Evolved Universal Terrestrial Radio Access) operating bands may also be used for communication. E-UTRA operating bands may mean operating bands of LTE.

The following table is an example of E-UTRA operating bands.

TABLE 9

| E-UTRA Operating Band | Uplink (UE) operating band BS receive UE transmit $F_{UL\_low}$-$F_{UL\_high}$ | Downlink (DE) operating band BS transmit UE receive $F_{DL\_low}$-$F_{DL\_high}$ | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1626.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 859 MHz-894 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| 32 | N/A | 1452 MHz-1496 MHz | FDD |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |
| 45 | 1447 MHz-1467 MHz | 1447 MHz-1467 MHz | TDD |
| 46 | 5150 MHz-5925 MHz | 5150 MHz-5925 MHz | TDD |
| 46 | 5150 MHz-5925 MHz | 5150 MHz-5925 MHz | TDD |
| 47 | 5855 MHz-5925 MHz | 5855 MHz-5925 MHz | TDD |
| 48 | 3550 MHz-3700 MHz | 3550 MHz-3700 MHz | TDD |
| 49 | 3550 MHz-3700 MHz | 3550 MHz-3700 MHz | TDD |
| 50 | 1432 MHz-1517 MHz | 1432 MHz-1517 MHz | TDD |
| 51 | 1427 MHz-1432 MHz | 1427 MHz-1432 MHz | TDD |
| 64 | Reserved | | |
| 65 | 1920 MHz-2010 MHz | 2110 MHz-2200 MHz | FDD |
| 66 | 1710 MHz-1780 MHz | 2110 MHz-2200 MHz | FDD |
| 67 | N/A | 738 MHz-758 MHz | FDD |
| 68 | 698 MHz-728 MHz | 753 MHz-783 MHz | FDD |
| 69 | N/A | 2570 MHz-2620 MHz | FDD |
| 70 | 1695 MHz-1710 MHz | 1995 MHz-2020 MHz | FDD |
| 71 | 663 MHz-698 MHz | 617 MHz-652 MHz | FDD |
| 72 | 451 MHz-456 MHz | 461 MHz-466 MHz | FDD |
| 73 | 450 MHz-455 MHz | 460 MHz-465 MHz | FDD |
| 74 | 1427 MHz-1470 MHz | 1475 MHz-1518 MHz | FDD |
| 75 | N/A | 1432 MHz-1517 MHz | FDD |
| 76 | N/A | 1427 MHz-1432 MHz | FDD |
| 85 | 698 MHz-716 MHz | 728 MHz-746 MHz | FDD |

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additonal radio resouce.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Carrier aggregation may be classified into a continuous carrier aggregation in which aggregated carriers are continuous and a non-contiguous carrier aggregation in which aggregated carriers are separated from each other. In the following, carrier aggregation simply should be understood to include both the case where the component carrier (CC) is continuous and the case where it is discontinuous. The number of CCs aggregated between the downlink and the uplink may be set differently. A case in which the number of downlink CCs and the number of uplink CCs are the same may be referred to as symmetric aggregation, and a case in which the number of downlink CCs are different may be referred to as asymmetric aggregation.

On the other hand, carrier aggregation can also be classified into inter-band CA and intra-band CA. The inter-band CA is a method of aggregating and using each CC existing in different operating bands, and the intra-band CA is a method of aggregating and using each CC in the same operating band. In addition, the CA technology is more specifically, intra-band contiguous CA, intra-band non-contiguous CA and inter-band discontinuity. Non-Contiguous) CA.

Figure 6A:
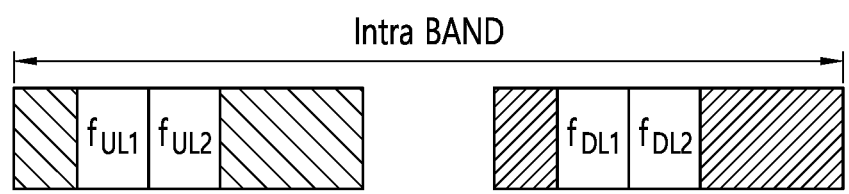
FIG. 6a illustrates a concept view of an example of intra-band contiguous CA.
Figure 6B:
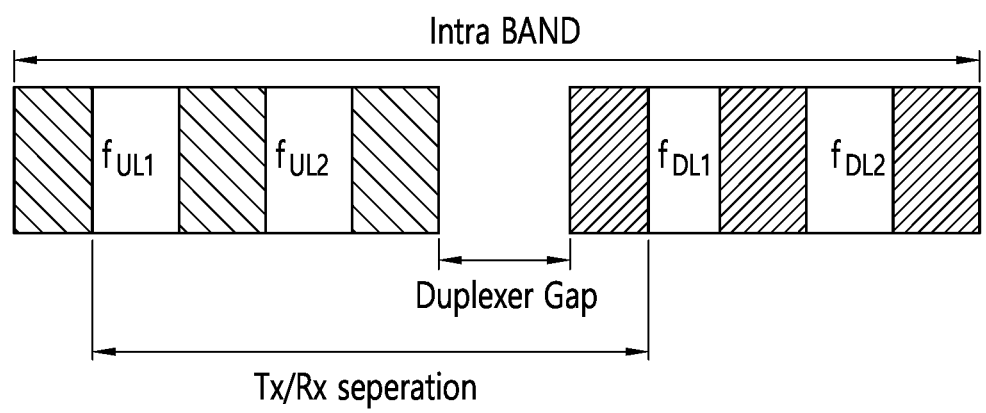
FIG. 6b illustrates a concept view of an example of intra-band non-contiguous CA.

FIG. 6a illustrates a concept view of an example of intra-band contiguous CA. FIG. 6b illustrates a concept view of an example of intra-band non-contiguous CA.

LTE-advanced adds various schemes including uplink MIMO and carrier aggregation in order to realize high-speed wireless transmission. The CA may be split into the intra-band contiguous CA shown in FIG. 6a and the intra-band non-contiguous CA shown in FIG. 6b.

Figure 7A:
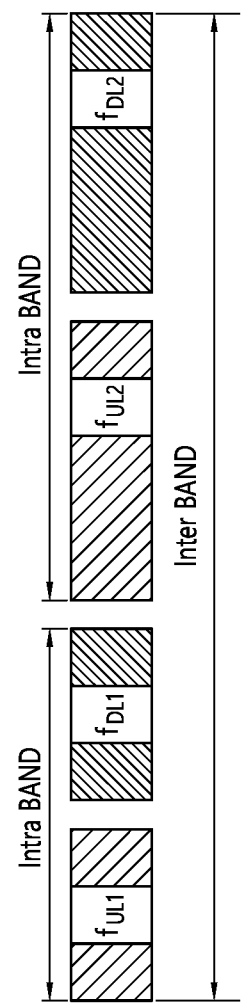
FIG. 7a illustrates a concept view of an example of a combination of a lower frequency band and a higher frequency band for inter-band CA.
Figure 7B:
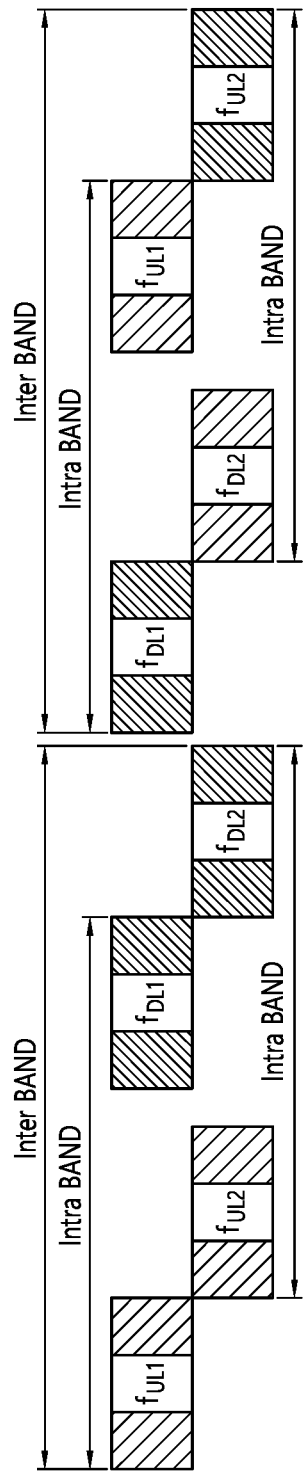
FIG. 7b illustrates a concept view of an example of a combination of similar frequency bands for inter-band CA.

FIG. 7a illustrates a concept view of an example of a combination of a lower frequency band and a higher frequency band for inter-band CA. FIG. 7b illustrates a concept view of an example of a combination of similar frequency bands for inter-band CA.

The inter-band carrier aggregation may be separated into inter-band CA between carriers of a low band and a high band having different RF characteristics of inter-band CA as shown in FIG. 7a and inter-band CA of similar frequencies that may use a common RF terminal per component carrier due to similar RF (radio frequency) characteristics as shown in FIG. 7b.

The following table is an example of Transmission bandwidth configuration $N_{RB}$ in E-UTRA.

TABLE 10

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

In Table 10, $N_{RB}$ may mean Transmission bandwidth configuration, expressed in units of resource blocks for E-UTRA.

The following table is an example of CA bandwidth classes and corresponding nominal guard band $BW_{GB}$. The example of CA bandwidth classes and corresponding nominal guard band $BW_{GB}$ may be used for CA in E-UTRA.

TABLE 11

| CA Bandwidth Class | Aggregated Transmission Bandwidth Configuration | Number of contiguous CC | Nominal Guard Band $BW_{GB}$ |
|---|---|---|---|
| A | $N_{RB, agg} \leq 100$ | 1 | $a_1 \, BW_{Channel(1)} - 0.5 \, \Delta f_1$ (NOTE 2) |
| B | $25 < N_{RB, agg} \leq 100$ | 2 | 0.05 max($BW_{Channel(1)}$, $BW_{Channel(2)}$) $- 0.5 \, \Delta f_1$ |
| C | $100 < N_{RB, agg} \leq 200$ | 2 | 0.05 max($BW_{Channel(1)}$, $BW_{Channel(2)}$) $- 0.5 \, \Delta f_1$ |
| D | $200 < N_{RB, agg} \leq 300$ | 3 | 0.05 max($BW_{Channel(1)}$, $BW_{Channel(2)}$, $BW_{Channel(3)}$) $- 0.5 \, \Delta f_1$ |
| E | $300 < N_{RB, agg} \leq 400$ | 4 | 0.05 max($BW_{Channel(1)}$, $BW_{Channel(2)}$, $BW_{Channel(3)}$, $BW_{Channel(4)}$) $- 0.5 \, \Delta f_1$ |

TABLE 11-continued

| CA Bandwidth Class | Aggregated Transmission Bandwidth Configuration | Number of contiguous CC | Nominal Guard Band $BW_{GB}$ |
|---|---|---|---|
| F | $400 < N_{RB,\,agg} \leq 500$ | 5 | 0.05 max($BW_{Channel(1)}$, $BW_{Channel(2)}$, $BW_{Channel(3)}$, $BW_{Channel(4)}$, $BW_{Channel(5)}$) − 0.5 $\Delta f_1$ |
| I | $700 < N_{RB,\,agg} \leq 800$ | 8 | NOTE 3 |

NOTE 1:
$BW_{Channel(j)}$, j = 1, 2, 3, 4 is the channel bandwidth of an E-UTRA component carrier according to Table 10 and $\Delta f_1 = \Delta f$ for the downlink with $\Delta f$ the subcarrier spacing while $\Delta f_1 = 0$ for the uplink.
(NOTE 2):
$a_1 = 0.16/1.4$ for $BW_{Channel(1)} = 1.4$ MHz whereas $a_1 = 0.05$ for all other channel bandwidths.
NOTE 3:
Applicable for later releases.

In Table 11, $BW_{GB}$ may mean nominal guard band. The nominal guard band may mean a virtual guard band to facilitate transmitter (or receiver) filtering above/below edge CC(Component Carrier)s. $N_{RB,agg}$ may mean the number of aggregated RBs within a fully allocated Aggregated Channel bandwidth.

The carrier aggregation configuration is a combination of operating bands, each supporting a carrier aggregation bandwidth class. The following table is an example of CA bandwidth classes in NR.

TABLE 12

| NR CA bandwidth class | Aggregated channel bandwidth | Number of contiguous CC | Fallback group |
|---|---|---|---|
| A | $BW_{Channel} \leq BW_{Channel,\,max}$ | 1 | 1, 2, 3 |
| B | 20 MHZ $\leq BW_{Channel\_CA} \leq$ 100 MHz | 2 | 2, 3 |
| C | 100 MHz $< BW_{Channel\_CA} \leq 2 \times BW_{Channel,\,max}$ | 2 | 1, 3 |
| D | 200 MHz $< BW_{Channel\_CA} \leq 3 \times BW_{Channel,\,max}$ | 3 | |
| E | 300 MHz $< BW_{Channel\_CA} \leq 4 \times BW_{Channel,\,max}$ | 4 | |
| G | 100 MHz $< BW_{Channel\_CA} \leq$ 150 MHz | 3 | 2 |
| H | 150 MHz $< BW_{Channel\_CA} \leq$ 200 MHz | 4 | |
| I | 200 MHz $< BW_{Channel\_CA} \leq$ 250 MHz | 5 | |
| J | 250 MHz $< BW_{Channel\_CA} \leq$ 300 MHz | 6 | |
| K | 300 MHz $< BW_{Channel\_CA} \leq$ 350 MHz | 7 | |
| L | 350 MHz $< BW_{Channel\_CA} \leq$ 400 MHz | 8 | |
| M | 50 MHz $< BW_{Channel\_CA} \leq$ [180] MHz | 3 | 3 |
| N | 80 MHz $< BW_{Channel\_CA} \leq$ [240] MHz | 4 | |
| O | 100 MHz $\leq BW_{Channel\_CA} \leq$ [300] MHz | 5 | |

In Table 12, $BW_{Channel\_CA}$ is maximum channel bandwidth supported among all bands. It is mandatory for a UE to be able to fallback to lower order NR CA bandwidth class configuration within a fallback group. It is not mandatory for a UE to be able to fallback to lower order NR CA bandwidth class configuration that belong to a different fallback group.

<Disclosure of the Present Specification>

Conventionally, for power class 2 User Equipment (UE), the impact of self interference, such as harmonics and/or IMD, on some E-UTRA NR Dual Connectivity (EN-DC) band combinations and on some inter-band Carrier Aggregation (CA) band combinations has not been analyzed. Thus, Maximum Sensitivity Degradation (MSD) values have not been discussed for these cases.

Also, for power class 2 UE, the impact of cross band isolations, which means interference on Rx(reception) band due to small frequency interval between Tx(Transmission) band and the Rx band, on some EN-DC band combinations and on some inter-band CA band combinations has not been analyzed. Thus, Maximum Sensitivity Degradation (MSD) values have not been discussed for these cases.

In 5G NR, EN-DC combinations, in which various E-UTRA bands and NR bands operate are simultaneously used, has been supported. And standards related to power class 2 (PC2) DC UE-related started to be defined, and standards allowing PC2 in NR inter-band CA will be discussed.

Herein, the power class of UE may mean the maximum allowed output power of the all type device including handheld device UE in FR1 frequency range. Specially, in FR2, RAN4 define the multiple power class according to device type such as handheld UE (Power class 3), FWA UE (power class 1) and vehicular UE (power class 2) as follow.

Table 13 shows an example of UE power class based on device types in FR2.

TABLE 13

| UE Power class | UE type |
|---|---|
| 1 | Fixed wireless access (FWA) UE |
| 2 | Vehicular UE |
| 3 | Handheld UE |
| 4 | High power non-handheld UE |
| 5 | Fixed wireless access (FWA) UE |

However, in FR1 range, the power class shall be distinguished by the maximum allowed power levels in all device type. Then, the power class 2 UE can support maximum output power up to 26 dBm. The power class 3 UE can support maximum output power up to 23 dBm as follow.

Table 14 shows an example of UE power class in FR1

TABLE 14

| NR band | Class 1 (dBm) | Tolerance (dB) | Class 1.5 (dBm) | Tolerance (dB) | Class 2 (dBm) | Tolerance (dB) | Class 3 (dBm) | Tolerance (dB) |
|---|---|---|---|---|---|---|---|---|
| n1 | | | | | | | 23 | ±31 |
| n2 | | | | | | | 23 | ±33 |
| n3 | | | | | | | 23 | ±33 |
| n5 | | | | | | | 23 | ±3 |
| n7 | | | | | | | 23 | ±33 |
| n8 | | | | | | | 23 | ±33 |
| n12 | | | | | | | 23 | ±33 |
| n13 | | | | | | | 23 | ±3 |
| n14 | 31 | +2/−3 | | | | | 23 | ±3 |
| n18 | | | | | | | 23 | ±38- |
| n20 | | | | | | | 23 | ±33 |
| n24 | | | | | | | 23 | +2/−3 |
| n25 | | | | | | | 23 | ±33 |
| n26 | | | | | | | 23 | ±33 |
| n28 | | | | | | | 23 | +2/−2.5 |
| n30 | | | | | | | 23 | ±3 |
| n34 | | | | | | | 23 | ±3 |
| n38 | | | | | | | 23 | ±3 |
| n39 | | | | | | | 23 | ±3 |
| n40 | | | | | 26 | +2/−3 | 23 | ±3 |
| n41 | | | 29 | +2/−3 | 26 | +2/−3 | 23 | ±33 |
| n47 | | | | | | | 23 | ±3 |
| n48 | | | | | | | 23 | +2/−3 |
| n50 | | | | | | | 23 | ±3 |
| n51 | | | | | | | 23 | ±3 |
| n53 | | | | | | | 23 | ±3 |
| n65 | | | | | | | 23 | ±3 |
| n66 | | | | | | | 23 | ±3 |
| n70 | | | | | | | 23 | ±3 |
| n71 | | | | | | | 23 | +2/−2.5 |
| n74 | | | | | | | 23 | ±34- |
| n77 | | | 29 | +2/−3 | 26 | +2/−3 | 23 | +2/−3 |
| n78 | | | 29 | +2/−3 | 26 | +2/−3 | 23 | +2/−3 |
| n79 | | | 29 | +2/−3 | 26 | +2/−3 | 23 | +2/−3 |
| . . . | | | | | | | | |

Similar to LTE-A CA, in 5G NR, a method of defining MSD due to self interference at the terminal receiving end for dual uplink of each DC band combination of the operator or CA combination is being discussed.

By defining the MSD, methods for solving the self-interference problem in various ways (e.g. harmonic trap filter, to mitigate desense caused by IMD or define the method of measuring reception sensitivity in an area where desense does not occur), such as allowing relaxation of the reception sensitivity of the terminal, or additionally using an element that mitigates distortion caused by IMD/Harmonic components, have been standardized.

In various examples herein, additional DC combinations (eg, PC2 FDD LTE+TDD NR band combinations) are discussed, and also PC2 NR inter-band CA combinations are being discussed. For various new DC/CA combinations, it is being discussed that PC2 is allowed.

Therefore, in the example of the disclosure of the present specification, a band combination in which a self interference problem occurs due to dual uplink transmission among various DC/CA combinations is analyzed.

For example, a band combination in which a reception sensitivity degradation phenomenon in the terminal's own reception band due to the harmonic component and IMD effect and/or cross band isolations occurs is analyzed. Cross band isolations may mean interference on Rx(reception) band due to small frequency interval between Tx(Transmission) band and the Rx band.

In addition, in the present specification, exceptions to the reception sensitivity requirements of the corresponding band combination are defined in the standard through the MSD (Maximum sensitivity degradation) analysis in consideration of the RF structure implemented in the terminal in this band combination. And, this exception may be applied to the reception sensitivity test of the corresponding terminal.

In the present specification, when the Power class 2 terminal performs communication based on NR CA or communication based on EN-DC, self-interference occurring in the terminal is analyzed. And, a relaxed standard for the sensitivity of such a terminal is proposed.

In various examples of the disclosure of the present specification, the self desense problem for DC/CA band combinations added in new PC2 DC band combinations (e.g. 1 FDD LTE operating band+1 TDD NR operating band) and PC2 NR inter-band CA is analyzed.

For example, the analysis on sensitivity degradation may be an analysis of how the effect on noise raising on non-lineality characteristics according to dual uplink transmission at the transmitting end of the UE affects the receiving end of the UE itself from the viewpoint of sensitivity.

For example, such an analysis may be performed by using the measurement values for the structure of the terminal (e.g. Cascaded diplexer structure, Duplexer-Triplexer, duplexer-Quadplexer structure, etc.), the devices used in the terminal, and isolation levels for each device (e.g. antenna isolation, PCB isolation, PA to PA isolation, PA to LNA isolation, etc.).

Accordingly, it is possible to analyze the effect of the effect on Tx noise raising caused by all effects actually occurring in the communication of the terminal on the decrease in Rx sensitivity at the frequency of the reception area of the terminal itself.

The result values derived according to the analysis below may be values measured and analyzed in consideration of the device characteristics of the corresponding terminal, unlike simply calculating the reception sensitivity in a single band mathematically.

Figure 8:
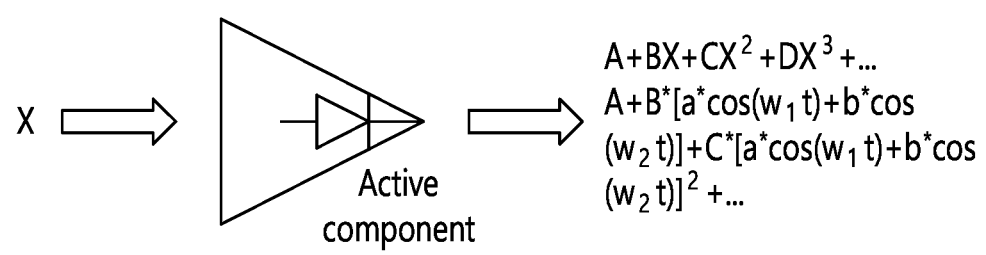
FIG. 8 illustrates an example of non-linearity caused by active component in the UE.

The following FIG. 8 shows an example of non-linearity caused by active component in the UE.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 8 illustrates an example of non-linearity caused by active component in the UE.

In particular, intermodulation in a terminal including an active component (PA, LNA) may be a component that occurs with one non-linear characteristic. When intermodulation occurs in a band adjacent to the wanted signal, intermodulation may not be removed even if a filter is used, and intermodulation has a characteristic of continuously producing additional nonlinear components.

In example shown in FIG. 8, the constant coefficient represents the DC component (A) and the amplification ratio of the original signal (B), and from the part of the second term, the harmonic/IMD component generated by the active element at 2×/3× is generated.

That is, the trigonometric function C*[a cos(w1t)+b cos(w2t)]2 of the quadratic term according to the harmonics component and/or the IMD component can generate a nonlinear component generated by mixing several signals as follows. These non-linear components are compounded according to the IMD order, resulting in non-linear characteristics.

$$C * [a * \cos(w_1 t) + b * \cos(w_2 t)]^2 =$$

$$C * [a^2 \cos^2(w_1 t) + 2ab * \cos(w_1 t)\cos(w_2 t) + b^2 \cos^2(w_2 t)] =$$

$$C * [a^2 * (1 + \cos(2w_1 t))/2 + ab * \cos(w_1 + w_2)t + ab * \cos(w_1 - w_2)t +$$

$$b^2 * (1 + \cos(2w_2 t))/2] = 0.5C(a^2 + b^2) + 0.5Ca^2 \cos(2w_1 t) +$$

$$0.5Cb^2 \cos(2w_2 t) + Cab * \cos(w_1 + w_2)t + Cab\cos(w_1 - w_2)t$$

Here, the constant $0.5C$ ($a^2+b^2$) value representing the non-linear characteristic and $0.5Ca^2 \cos(2w_1 t)$ and $0.5Cb^2 \cos(2w_2 t)$ components expressed as first-order terms represent the harmonic components according to each frequency. $Cab*\cos(w_1+w_2)t$ and $Cab*\cos(w_1-w_2)t$ shows that the IMD component that occurs when a signal and b signal are transmitted at the same time occurs at the corresponding frequency.

The influence on the 3rd and 4th order or higher functions is also shown by adding more non-linear characteristics as above, and the non-linear characteristics according to these equations appear complexly at the receiving end.

Therefore, in 5G NR, a high-power terminal supports communication at a high frequency in a channel bandwidth wider than that of conventional mobile communication. Accordingly, in the example of the disclosure of the present specification, characteristics of the corresponding band of the terminal device are identified. And, using these characteristics, the example of the disclosure of the present specification can identify and analyze the noise increase and nonlinear characteristics of the component of the transmitting end due to the characteristics of the nonlinear element to the receiving end. Through this, an example of the disclosure of the present specification analyzes a decrease in sensitivity of the receiving end.

Accordingly, in the present specification, among various EN-DC band combinations, a EN-DC band combination in which a reception sensitivity reduction phenomenon occurs in its own reception band due to IMD, a harmonic component and/or cross band isolations is analyzed. In addition, in this specification, the MSD (maximum sensitivity degradation) in consideration of the UE-implemented RF (Radio Frequency) structure in the EN-DC band combinations and/or PC2 NR inter-band CA band combinations is analyzed. Through the analyzed MSD, exceptions to the reception sensitivity requirements of the EN-DC band combinations and/or PC2 NR inter-band CA band combinations are proposed for the standard. An exception to the reception sensitivity requirement of the EN-DC band combinations and/or PC2 NR inter-band CA band combinations may be applied as an exception to the reception sensitivity test of the corresponding UE.

The following drawings are prepared to explain a specific example of the present specification. Since the names of specific devices or names of specific signals/messages/fields described in the drawings are provided by way of example, technical features of the present specification are not limited to specific names used in the following drawings.

Figure 9:
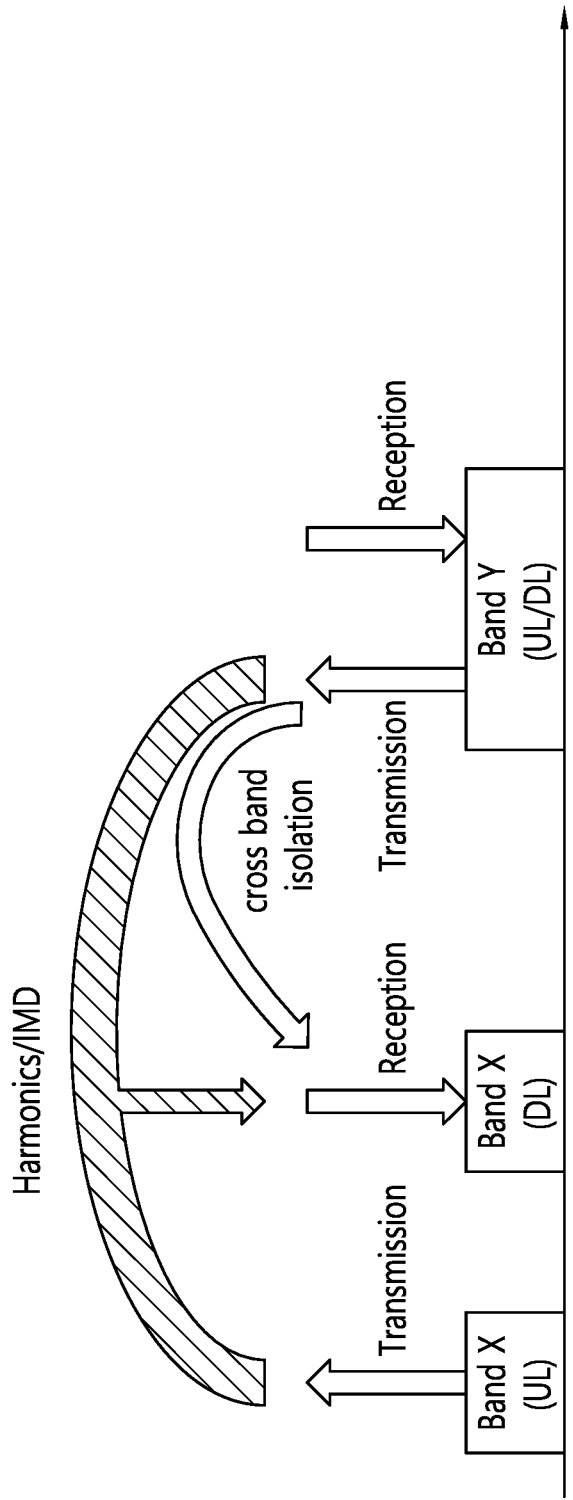
FIG. 9 illustrates an example of situation in which an uplink signal transmitted via an uplink operating band affects reception of a downlink signal on via downlink operating band.

FIG. 9 illustrates a second example of situation in which an uplink signal transmitted via an uplink operating band affects reception of a downlink signal on via downlink operating band.

In FIG. 9, Intermodulation Distortion (IMD) may mean amplitude modulation of signals containing two or more different frequencies, caused by nonlinearities or time variance in a system. The intermodulation between frequency components will form additional components at frequencies that are not just at harmonic frequencies (integer multiples) of either, like harmonic distortion, but also at the sum and difference frequencies of the original frequencies and at sums and differences of multiples of those frequencies.

Referring to FIG. 9, an example in which an EN-DC or NR inter-band CA is configured with a UE is shown. For example, the UE may perform communication by using the EN-DC or the NR inter-band CA based on at least one downlink operating bands (DL Band X, Y) and at least one uplink operating bands (UL Band X, Y).

As shown in FIG. 9, in a situation in which at least one downlink operating bands are configured by the EN-DC or by the NR inter-band CA and at least one uplink operating bands are configured by the EN-DC or by the NR inter-band CA, the UE may transmit an uplink signal through at least one uplink operating bands. In this case, a harmonics component and an intermodulation distortion (IMD) component occurring based on the frequency band of the uplink signal may fall into its own downlink band. That is, in the example of FIG. 9, when the UE transmits the uplink signal, the harmonics component and the intermodulation distortion (IMD) component may occur, which may affect the downlink band of the UE itself.

Also, as shown in FIG. 9, when the UE is configured with the EN-DC or the NR inter-band CA, the UE may transmit uplink signal via band Y and may receive downlink signal via band X. In this case, the impact of cross band isolations, which means interference on Rx(reception) band (e.g. band X) due to small frequency interval between Tx(Transmission) band (e.g. band Y) and the Rx band (e.g. band X), on some EN-DC band combinations and on some inter-band CA band combinations may occur. Cross band isolations may affect the downlink band of the UE itself.

The UE should be configured to satisfy a reference sensitivity power level (REFSENS) which is the minimum average power for each antenna port of the UE when receiving the downlink signal.

When the harmonics component and/or IMD component occur as shown in the example of FIG. 9, there is a possibility that the REFSENS for the downlink signal may not be satisfied due to the uplink signal transmitted by the UE itself. Also, when the cross band isolation occur as shown in the example of FIG. 9, there is a possibility that the REFSENS for the downlink signal may not be satisfied due to the uplink signal transmitted by the UE itself.

For example, the REFSENS may be set such that the downlink signal throughput of the UE is 95% or more of the maximum throughput of the reference measurement channel. When the harmonics component, IMD component, and/or cross band isolation occur, there is a possibility that the downlink signal throughput is reduced to 95% or less of the maximum throughput.

Therefore, when he harmonics component, IMD component, and/or cross band isolation, whether he harmonics component, IMD component, and/or cross band isolation of the UE occur may be determined, and the maximum sensitivity degradation (MSD) value is defined for the corresponding frequency band, so relaxation for REFSENS in the reception band related to its own transmission signal may be allowed. Here, the MSD may mean the maximum allowed reduction of the REFSENS. When the MSD is defined for a specific operating band of the UE, which configured with the EN-DC or the NR inter-band CA, the REFSENS of the corresponding operating band may be relaxed by the amount of the defined MSD.

Hereinafter, in examples of the disclosure of the present specification, self desense and/or self-interference due to NR CA operation or EN-DC operation, performed by a power class 2 UE, in an EN-DC band combinations or NR CA band combinations are analyzed, and a relaxed standard for sensitivity thereto is proposed. For example, the relaxed standard for sensitivity may be based on MSD.

In first example of the disclosure of the present specification, examples of self-interference analysis and MSD values for PC2 DC band combinations are explained. In second example of the disclosure of the present specification, examples of self-interference analysis and MSD values for PC2 NR inter-band CA band combinations are explained.

1. First Example of the Disclosure of the Present Specification

Hereinafter, self-interference for PC2 UE configured with DC is analyzed. PC2 UE configured with DC may be referred to PC2 DC UE. Various combinations of downlink operating bands and uplink operating bands in the first example of the disclosure of the present specification may be used for the DC. For example, for DC, combinations of one E-UTRA operating bands and one NR operating band may be used. Based on the combinations of one E-UTRA operating band and one NR operating band, a UE may be configured to use 2 uplink operating bands (one E-UTRA operating band and one NR operating band) and 2 downlink operating bands (one E-UTRA operating band and one NR operating band). For example, 1 LTE(or E-UTRA) FDD operation band and one NR TDD operation band may be used as DC band combination.

Table 15 shows examples of new DC bands included to support PC2 DC band combinations.

TABLE 15

| EN-DC configuration | status (new, ongoing, completed, stopped) |
| --- | --- |
| DC_1A_n78A | Completed for PC3, Completed for PC2 |
| DC_8A_n78A | Completed for PC3, Completed for PC2 |
| DC_2A_n41A | Completed for PC3, New for PC2 |
| DC_66A_n41A | Completed for PC3, New for PC2 |
| DC_7A_n78A | Completed for PC3, New for PC2 |
| DC_2A_n77A | Completed for PC3, New for PC2 |
| DC_5A_n77A | Completed for PC3, New for PC2 |
| DC_13A_n77A | Completed for PC3, New for PC2 |
| DC_66A_n77A | Completed for PC3, New for PC2 |

According to examples of Table 15, DC_1A_n78A, DC_8A_n78A, DC_2A_n41A, DC_66A_n41A, DC_7A_n78A, DC_2A_n77A, DC_SA_n77A, DC_13A_n77A, DC_66A_n77A are newly included to support PC2 DC operation.

For example, DC_2A_n41A may mean that E-UTRA operating band 2 and NR operating band n41 are configured to be DC operating band combination for PC2 DC UE.

For example, Alphabets (A, B, C, D, and the like) after the number in Table 15 refer to a bandwidth class described in the example of Table 11 and Table 12.

Conventionally, the impact of harmonics, IMD, and/or cross band isolations on some combinations in the DC case (for example, EN-DC case) has not been analyzed and the MSD values for the combinations in the DC case have not been discussed. For example, the impact of the harmonics and/or IMD for a combination of DC cases of Table 16, which will be described later, is not analyzed, and the MSD values have not been discussed.

In the DC case, the UE may perform dual uplink transmission through two uplink operating bands. In this case, the MSD value for analyzing the impact of the harmonics and/or IMD occurring in the downlink operating bands and relaxing the REFSENS specification needs to be proposed.

Hereinafter, the impact of the harmonics, IMD, and/or cross band isolations in the DC case based on the DC combinations is analyzed. In addition, the MSD value for relaxing the RESENS specification based on the analyzed results is proposed.

For example, self-interference (for example, harmonics, IMD, and/or cross band isolations) occurring in the UE, which is configured with DC (1 LTE(or E-UTRA) FDD operation band and one NR TDD operation band), may be analyzed. In addition, the MSD value may be set based on the analyzed self-interference, and a reference sensitivity specification, which is relaxed due to the MSD, may be defined.

In other words, in the present disclosure, for the UE, which configured with the DC may be analyzed. In addition, in the present disclosure, the maximum sensitivity degradation (MSD) value may be proposed in consideration of a radio frequency (RF) structure in a combination of bands in which the impact of self-interference is analyzed. The proposed MSD makes it possible to make exceptions to the reference sensitivity of the band (for example, to relax the REFSENS based on the MSD value). The reference sensitivity to which the exceptions are applied during the UE test may be applied to the UE, and the UE may pass the UE test based on the applied reference sensitivity.

As described above, for the combination of the UL operating band and the DL operating band having the self-interference problem, the MSD needs to be determined.

For the DC band combinations, the MSD for one downlink band affected by the harmonic and/or IMD occurring during the dual uplink transmission based on two UL operating bands may be provided below.

Table 16 below shows an example of DC band combinations associated with the self-interference problem. For example, Table 16 summarizes the EN-DC band combinations with self-interference problems for DC operation for PC2 UE. In detail, Table 16 shows an example of self-interference analysis for 1 LTE(or E-UTRA) FDD operation band and one NR TDD operation band DC operation.

TABLE 16

| Downlink band configuration | Uplink DC Configuration | Harmonic relation issues | intermodulation to own rx band | interference due to small frequency separation | MSD |
|---|---|---|---|---|---|
| DC_2_n41 | DC_2A-n41A | No harmonic problem between two band | No IMD problem into B2 No IMD problem into n41 | Need to define MSD for cross band isolation issue in Band 2 | 0.6 dB MSD value for PC3 was defined. -> need to define new MSD values for PC2 |
| DC_66_n41 | DC_66A_n41A | No harmonic problem between two band | No IMD problem into B66 4th IMD fall into n41. But TDD band only allow Tx or Rx in the same time -> No issue | Need to define MSD for cross band isolation issue in Band 66 | 3.5 dB MSD value for PC3 was defined. -> need to define new MSD values for PC2 |
| DC_7_n78 | DC_7A_n78A | No harmonic problem between two band | No IMD problem into B7 4th IMD fall into n78. But TDD band only allow Tx or Rx in the same time -> No issue | Need to define MSD for cross band isolation issue in Band 7 | 4.5 dB MSD value for PC3 was defined. -> need to define new MSD values for PC2 |
| DC_2_n77 | DC_2A_n77A | $2^{nd}$ harmonic from B2 fall into n77. But TDD band only allow Tx or Rx in the same time -> No issue | $2^{nd}$, $4^{th}$ & $5^{th}$ IMDs fall into B2 $4^{th}$ & $5^{th}$ IMDs fall into n77. But TDD band only allow Tx or Rx in the same time -> No issue | No cross band isolation issues | 26.0 dB/8.0 dB MSD values by $2^{nd}$/$4^{th}$ IMD are specified for PC3 DC_2A_n78A UE. -> need to define new MSD values for PC2 UE |
| DC_5_n77 | DC_5A_n77A | $4^{th}$ & $5^{th}$ harmonics from B5 fall into n77. But TDD band only allow Tx or Rx in the same time -> No issue | $4^{th}$ & $5^{th}$ IMDs fall into B5 $2^{nd}$ & $5^{th}$ IMDs fall into n77. But TDD band only allow Tx or Rx in the same time -> No issue | No cross band isolation issues | 8.3 dB MSD value by $4^{th}$ IMD is specified for PC3 DC_5A_n78A UE. -> need to define new MSD values for PC2 UE |
| DC_13_n77 | DC_13A_n77A | $5^{th}$ harmonics from B13 fall into n77. But TDD band only allow Tx or Rx in the same time -> No issue | $5^{th}$ IMD fall into B13 $2^{nd}$ IMD fall into n77. But TDD band only allow Tx or Rx in the same time -> No issue | No cross band isolation issues | There is no MSD requirements for PC3 DC_13A_n77A UE. -> need to define new MSD values for PC2 UE |

TABLE 16-continued

| Downlink band configuration | Uplink DC Configuration | Harmonic relation issues | inter-modulation to own rx band | interference due to small frequency separation | MSD |
|---|---|---|---|---|---|
| DC_66_n77 | DC_66A_n77A | $2^{nd}$ harmonic from B66 fall into n77. But TDD band only allow Tx or Rx in the same time -> No issue | $2^{nd}$ & $5^{th}$ IMDs fall into B66. $4^{th}$ & $5^{th}$ IMDs fall into n77. But TDD band only allow Tx or Rx in the same time -> No issue | No cross band isolation issues | 5.0 dB MSD value by $5^{th}$ IMD is specified for PC3 DC_66A_n78A UE. -> need to define new MSD values for PC2 UE |

Alphabets (A, B, C, D, and the like) after the number in Table 16 refer to a bandwidth class described in the example of Table 11 and Table 12.

There are cross band isolation issues and IMD problems to the own Rx band when dual uplink is applied. Hence, First Example of the Disclosure of the Present Specification may define the MSD requirements for PC2 DC (1 LTE FDD band+1 NR TDD band) band combinations.

Referring to Table 16, the self-interference problem of various DC band combinations are needed to be analyzed in the present specification. That is, the MSD values for various EN-DC band combinations are not defined yet.

Figure 10:
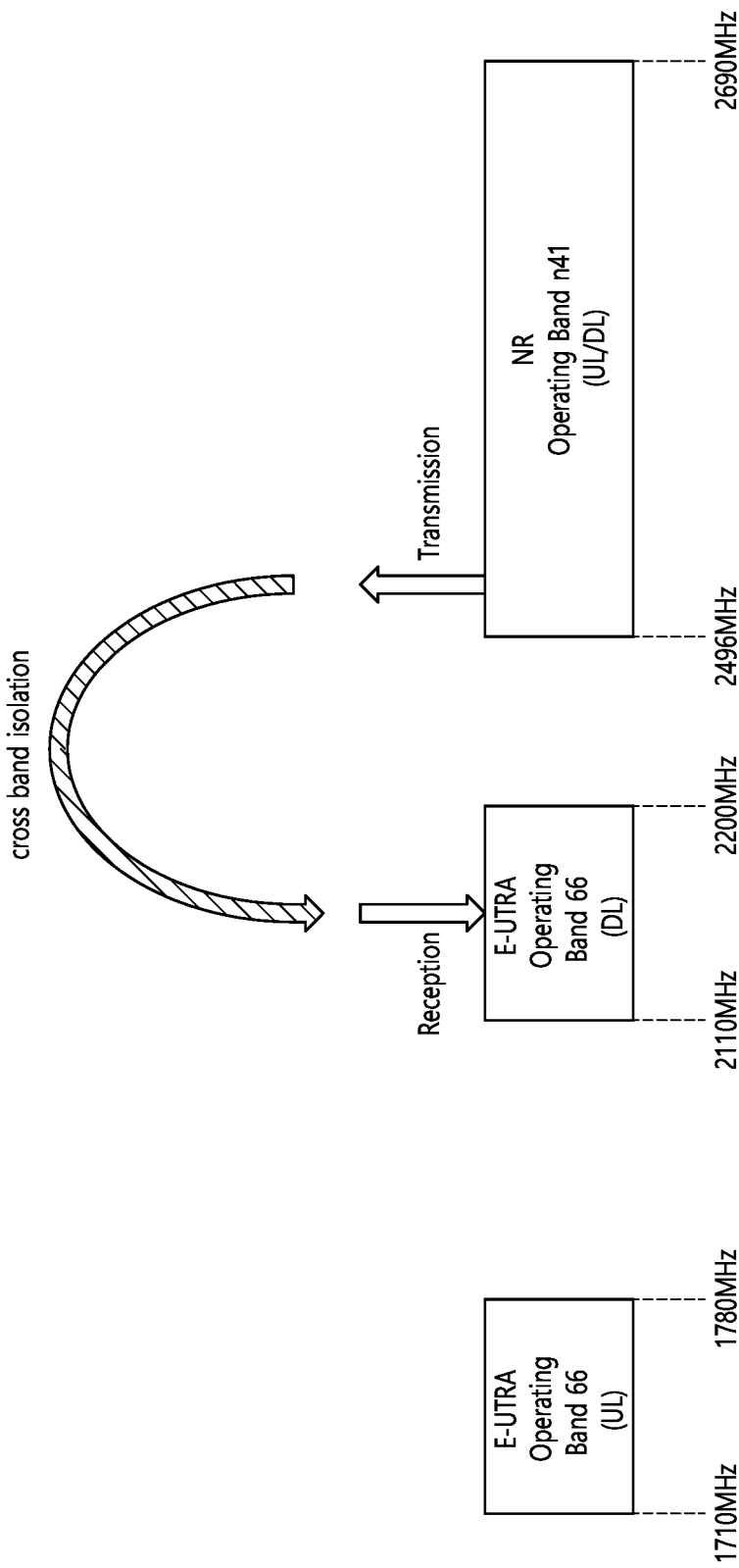
FIG. 10 illustrates an example of cross-band isolation issue for PC2 EN-DC with band combination of NR operating band n41 and E-UTRA operating band 66.
Figure 11:
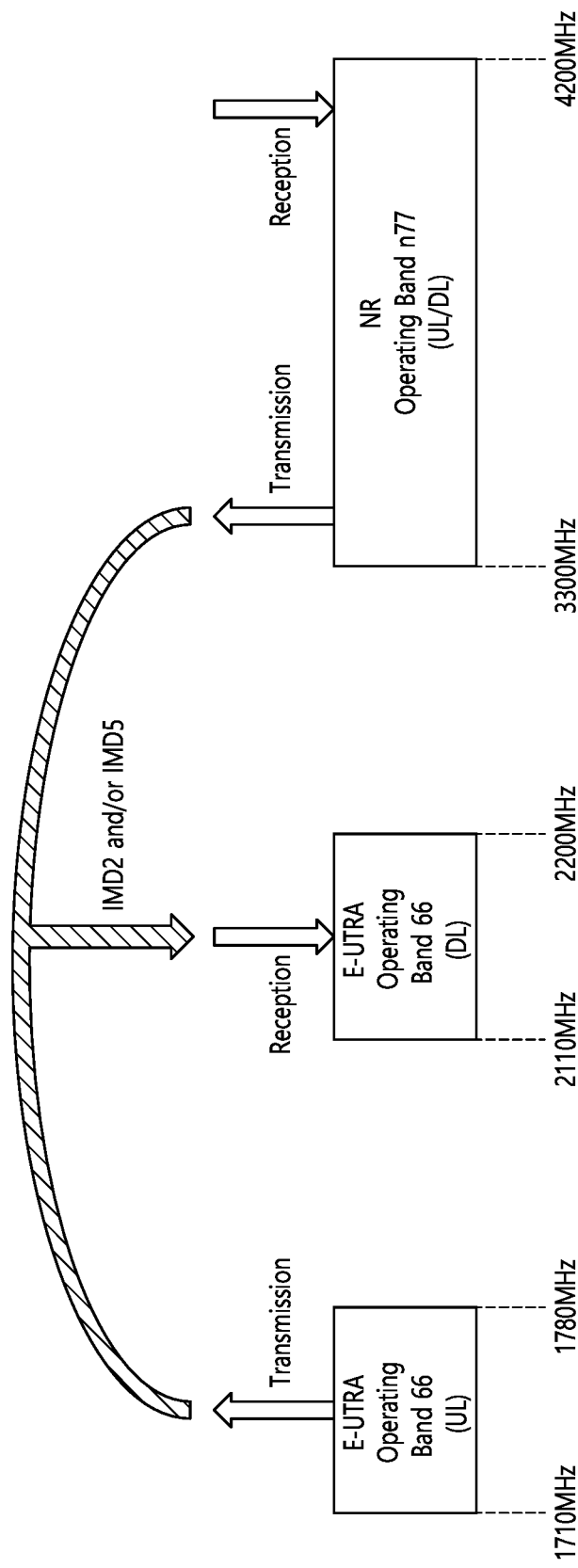
FIG. 11 illustrates an example of IMD issue for PC2 EN-DC with band combination of downlink bands n77, 66 and uplink bands n77, 66.\

FIG. 10 shows an example of cross-band isolation issue according to Table 16. FIG. 11 shows an example of IMD issue according to Table 16.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 10 illustrates an example of cross-band isolation issue for PC2 EN-DC with band combination of NR operating band n41 and E-UTRA operating band 66.

FIG. 10 shows an example of self interference (e.g. cross band isolations) affecting the downlink band 66 for EN-DC with band combination NR operating band n41, and E-UTRA operating band 66. For example, the cross band isolations affecting the E-UTRA downlink band 66 in the EN-DC combination of NR operating band n41, and E-UTRA operating band 66.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 11 illustrates an example of IMD issue for PC2 EN-DC with band combination of downlink bands n77, 66 and uplink bands n77, 66.

FIG. 10 shows an example of self interference (e.g. IMD 2 and/or IMD5) affecting the downlink band 66 for EN-DC with band combination downlink bands n77, 66 and uplink bands n77, 66. For example, the IMD 2 and/or 5 affecting the downlink band 66 in the combination of DC_66A_n77A downlink band and DC_66A_n77A uplink band.

Referring to FIG. 11, a $2^{nd}$ order IMD (IMD 2) and/or 5th order IMD (IMD 5) component of an uplink signal transmitted in the uplink band n77 and an uplink signal transmitted in the uplink band 66 may fall into a frequency range of the downlink band 66.

The worst case, where the impact of the IMD 2 within the frequency range of the downlink band 66 is greatest, is the case where a center frequency of the uplink band n77 is 3860 MHz, a center frequency of the uplink operating band 66 is 1730 MHz, and a center frequency of the downlink operating band 66 is 2130 MHz. In this case, since 3860−1730=2130, the frequency of the IMD2 component of the uplink bands 66 and n77 coincides with the center frequency of the downlink band 66.

The worst case, where the impact of the IMD 5 within the frequency range of the downlink band 66 is greatest, is the case where a center frequency of the uplink band n77 is 3660 MHz, a center frequency of the uplink operating band 66 is 1730 MHz, and a center frequency of the downlink operating band 66 is 2130 MHz. In this case, since 3660*2−1730*3=2130, the frequency of the IMD5 component of the uplink bands 66 and n77 coincides with the center frequency of the downlink band 66.

For example, for EN-DC band combination of the DC_2_n41 downlink band and the DC_2A_n41A uplink band, cross band isolation issue in E-UTRA operating band 2 is not analyzed previously. For example, for EN-DC band combination of the DC_66_n41 downlink band and DC_66A_n41A uplink band, cross band isolation issue in E-UTRA operating band 66 is not analyzed previously. For example, for EN-DC band combination of the DC_7_n78 downlink band and the DC_7A_n78A uplink band, cross band isolation issue in E-UTRA operating band 7 is not analyzed previously. For example, for DC band combination of the DC_2_n77 downlink band and the DC_2A_n77A uplink band, 2nd, 4th, 6th IMD in E-UTRA operating band 2 are not analyzed previously. For example, for DC band combination of the DC_5_n77 downlink band and the DC_5A_n77A uplink band, $4^{th}$ and 6th IMD in E-UTRA operating band 5 are not analyzed previously. For example, for DC band combination of the DC_13_n77 downlink band and the DC_13A_n77A uplink band, 6th IMD in E-UTRA operating band 13 are not analyzed previously. For example, for DC band combination of the DC_66_n77 downlink band and the DC_66A_n77A uplink band, $2^{nd}$ and 5th IMD in E-UTRA operating band 66 are not analyzed previously.

Hereinafter, analysis for PC2 DC band combinations are described.

1) Analysis Based on Cross Band Isolation Issues

Table 17 shows examples of the MSD requirements, which were conventionally defined, for cross band isolation issues for power class 3 DC UE with LTE 1 FDD band and NR 1 TDD band combinations.

and the upper edge of the downlink channel in Band 3 is <60 MHz. For each channel bandwidth in Band 3, the

TABLE 17

| | | E-UTRA or NR Band/Channel bandwidth of the affected DL band/MSD | | | | | | | | | | | | |
|---|---|---|---|---|---|---|---|---|---|---|---|---|---|---|
| UL band | DL band | 5 MHz (dB) | 10 MHz (dB) | 15 MHz (dB) | 20 MHz (dB) | 25 MHz (dB) | 30 MHz (dB) | 40 MHz (dB) | 50 MHz (dB) | 60 MHz (dB) | 70 MHz (dB) | 80 MHz (dB) | 90 MHz (dB) | 100 MHz (dB) |
| n1 (Note 3) | 3 | 3 | 2.3 | 2 | 1.8 | | | | | | | | | |
| n1 | 40 | 6.6 | 6.6 | 6.6 | 6.6 | | | | | | | | | |
| 1 (Note 3) | n3 | 3 | 2.2 | 1.9 | 1.7 | 1.6 | 1.5 | 1.4 | | | | | | |
| 1 | n40 | 6.6 | 6.6 | 6.6 | 6.6 | 6.6 | 6.6 | 6.6 | 6.6 | 6.6 | | 6.6 | | |
| 1 | n41 | | 6.1 | 6.1 | 6.1 | | 6.1 | 6.1 | 6.1 | 6.1 | | 6.1 | 6.1 | 6.1 |
| n3 | 11 | 6.4 | 6.1 | | | | | | | | | | | |
| 3 | n41 | | 0.7 | 0.7 | 0.7 | | 0.7 | 0.7 | 0.7 | 0.7 | | 0.7 | 0.7 | 0.7 |
| 3 | n51 | 6.4 | | | | | | | | | | | | |
| 30 | n66 | 8.3 | 8.3 | 8.3 | 8.3 | 8.3 | 8.3 | 8.3 | | | | | | |
| n3 | 41 | 0.7 | 0.7 | 0.7 | 0.7 | | | | | | | | | |
| n5 | 28 | 4.5 | 3 | 2.2 | 0.3 | | | | | | | | | |
| 7 | n40 | 3.7 | 3.4 | 3.2 | 3.1 | 3.1 | 3.1 | 3.1 | 3.1 | 3.1 | | 3.1 | | |
| n38 | 1 | 1.9 | 1.9 | 1.9 | 1.9 | | | | | | | | | |
| n38 | 2 | 0.6 | 0.6 | 0.6 | 0.6 | | | | | | | | | |
| n38 | 4 | 1.9 | 1.9 | 1.9 | 1.9 | | | | | | | | | |
| n38 | 66 | 1.9 | 1.9 | 1.9 | 1.9 | | | | | | | | | |
| n40 | 1 | 8.3 | 8.3 | 8.3 | 8.3 | | | | | | | | | |
| n41 | 4 | 3.5 | 3.5 | 3.5 | 3.5 | | | | | | | | | |
| 40 | n1 | 8.3 | 8.3 | 8.3 | 8.3 | 8.3 | 8.3 | 8.3 | | | | | | |
| n40 | 7 | 3.7 | 3.7 | 3.7 | 3.7 | | | | | | | | | |
| n41 | 1 | 9.1 | 9.1 | 9.1 | 9.1 | | | | | | | | | |
| n41 | 2 | 0.6 | 0.6 | 0.6 | 0.6 | | | | | | | | | |
| n41 | 3 | 0.6 | 0.6 | 0.6 | 0.6 | | | | | | | | | |
| 41 | n3 | 0.6 | 0.6 | 0.6 | 0.6 | 0.6 | 0.6 | 0.6 | | | | | | |
| n41 | 66 (Note 1) | 3.5 | 3.5 | 3.5 | 3.5 | | | | | | | | | |
| n41 | 25 | 0.6 | 0.6 | 0.6 | 0.6 | | | | | | | | | |
| n50 | 3 | 2.5 | 1.9 | 1.6 | 1.5 | | | | | | | | | |
| n77 | 7 (Note 1) | 4.5 | 4.5 | 4.5 | 4.5 | | | | | | | | | |
| n77 | 41 (Note 1) | 4.5 | 4.5 | 4.5 | 4.5 | | | | | | | | | |
| 41 | n77 | | 8.3 | 8.3 | 8.3 | 7.3 | 6.5 | 6.3 | 5.3 | 4.5 | 4.3 | 4.0 | 3.9 | 3.8 |
| n78 | 7 (Note 1) | 4.5 | 4.5 | 4.5 | 4.5 | | | | | | | | | |
| n78 | 38 | 3.3 | 3.3 | 3.3 | 3.3 | | | | | | | | | |
| n78 | 41 (Note 1) | 4.5 | 4.5 | 4.5 | 4.5 | | | | | | | | | |
| n78 | 46 | | | | 7 | | | | | | | | | |
| 41 | n78 | | 8.3 | 8.3 | 8.3 | 7.3 | 6.5 | 6.3 | 5.3 | 4.5 | 4.3 | 4.0 | 3.9 | 3.8 |
| n84 (Note 3) | 3 | 3 | 2.3 | 2 | 1.8 | | | | | | | | | |

Table 17 shows examples of Reference sensitivity exceptions (e.g. MSD) due to cross band isolation for PC3 EN-DC in NR FR1.

The following NOTEs 1 to 5 are applied to examples of Table 17.

NOTE 1: Applicable only when harmonic mixing MSD for this combination is not applied. Herein, harmonic mixing may mean that additional non-linear source will be generated by the reciprocal of fundamental signal frequency (fc) such as ½ fc, ¼*fc, ⅛*fc elements. Herein, fc means center frequency.

NOTE 2: The B41 requirements (requirements related to E-UTRA operating band 41) are modified by −0.5 dB when carrier frequency of the assigned E-UTRA channel bandwidth is within 2515-2690 MHz.

NOTE 3: These requirements apply when the uplink is active in NR Band n1, n84 and the separation between the lower edge of the uplink channel in Band n1, n84 requirement applies regardless of channel bandwidth in Band n1, n84.

NOTE 4: The DL victim band should be configured using the lowest SCS that is compatible with the highest CBW for which an MSD is specified.

NOTE 5: MSD test point can be chosen according to supported BW and lowest SCS supported by the UE.

In here, power combination of 23 dBm+23 dBm or power combination of 23 dBm+26 dBm per LTE or NR system for PC2 DC UE are allowed. And PC2 transmission per E-UTRA is not allowed. For example, when PC2 DC is configured for the UE, it is not allowed for the UE to transmit signal based on transmission power of 26 dBM on E-UTRA.

Based on the specified MSD value, the present specification analyse the MSD value for the PC2 DC_2A_n41A, DC_66A_n41A and DC_7A_n78A UE with follow simulation assumptions in Table 18 to Table 20 when NR Transmission power is configured with 26 dBm

TABLE 18

| | |
|---|---|
| Band n41 PA noise @Band 2 Rx (dBm/Hz) | −118 |
| RFIC IIP2 (dBm) | 50 |
| n41 front end filter Loss (dB) | 4 |
| B2 front end filter Loss (dB) | 4 |

TABLE 18-continued

| | |
|---|---|
| PA to antenna and LNA to antenna IL (dB) | 4 |
| B2/B41 diplexer isolation (dB) | 10 |
| B41 filter attenuation @ B2 RX (dB) | 30 |
| Cross-band isolation (dB) (n41 Tx --> B2 Rx) | 44 |
| Rx Antenna isolation (dB) | 10 |

Table 18 shows simulation assumptions for DC band combination 2A and n41A for MSD requirements.

TABLE 19

| | |
|---|---|
| Band n41 PA noise @Band 66 Rx (dBm/Hz) | −117 |
| RFIC IIP2 (dBm) | 50 |
| n41 front end filter Loss (dB) | 4 |
| B66 front end filter Loss (dB) | 4 |
| PA to antenna and LNA to antenna IL (dB) | 4 |
| B66/B41 diplexer isolation (dB) | 10 |
| B41 filter attenuation @ B66 RX (dB) | 30 |
| Cross-band isolation (dB) (n41 Tx --> B66 Rx) | 42 |
| Rx Antenna isolation (dB) | 10 |

Table 19 shows simulation assumptions for DC band combination 66A and n41A for MSD requirements.

TABLE 20

| | |
|---|---|
| Band n78 PA noise @Band 7 Rx (dBm/Hz) | −115 |
| RFIC IIP2 (dBm) | 50 |
| n78 front end filter Loss (dB) | 4 |
| B7 front end filter Loss (dB) | 4 |
| PA to antenna and LNA to antenna IL (dB) | 4 |
| B7/n78 diplexer isolation (dB) | 10 |
| n78 filter attenuation @ B7 RX (dB) | 30 |
| Band 7 Cross-band isolation (dB) at Band n78 Rx (Tx filter) | 40 |
| Rx Antenna isolation (dB) | 10 |

Table 20 shows simulation assumptions for DC band combination 7A and n78A for MSD requirements.

In examples of Table 18 to Table 20, PA may mean a power amplifier. RFIC IIP2 (input $2^{nd}$ order intercept point) may mean the expected input IP2 level of Radio Frequency Integrated Circuits (RFIC) in data sheet or measured level. LNA may mean a low noise amplifier.

By performing simulation based on the simulation assumptions for PC2 DC in Table 18 to Table 20, the cross band isolations and MSD for various DC band combinations are analyzed.

Based on the above simulation assumptions, the MSD values are derived as follow by using maximum-ratio combining (MRC) combining.

Table 21 shows derived MSD values due to cross band isolation for PC2 for DC band combinations for power combination of 23 dBm+26 dBm. Herein, 23 dBm+26 dBm may mean that maximum output power of 23 dBm is used for E-UTRA operating band and maximum output power of 26 dBm is used for NR operating band.

TABLE 21

| | | E-UTRA or NR Band/Channel bandwidth of the affected DL band/MSD | | | | | | | | | | | |
|---|---|---|---|---|---|---|---|---|---|---|---|---|---|
| UL band | DL band | 5 MHz (dB) | 10 MHz (dB) | 15 MHz (dB) | 20 MHz (dB) | 25 MHz (dB) | 30 MHz (dB) | 40 MHz (dB) | 50 MHz (dB) | 60 MHz (dB) | 80 MHz (dB) | 90 MHz (dB) | 100 MHz (dB) |
| n41 | 2 | 2.3 | 2.3 | 2.3 | 2.3 | | | | | | | | |
| n41 | 66 | 5.3 | 5.3 | 5.3 | 5.3 | | | | | | | | |
| n78 | 7 | 6.5 | 6.5 | 6.5 | 6.5 | | | | | | | | |

In Table 21, 5 Mhz, 10 MHz, 15 MHz, . . . may mean channel bandwidth of the affected DL band.

For reference, ±α tolerance may be applied to the MSD values shown in the Table 21. α may be 0, 0.1, 0.2, 0.3, 0.4, 0.5, 0.6, 0.7, . . . 2.7. For example, MSD values proposed in the present specification may include MSD value to which the ±α tolerance is applied.

The reception performance of the UE can be tested by applying the MSD values in Table 21 to the reference sensitivity of the downlink operating band of the various EN-DC band combinations. In other words, the MSD values in Table 21 may be applied to the reference sensitivity of the downlink operating band of the various EN-DC band combinations and may be used when the reception performance of the UE is tested. The transceiver (or receiver) of the UE that passed the test satisfies the minimum requirements based on the reference sensitivity to which the MSD values in Table 21 apply.

2) Analysis Based on Inter-Modulation Problems by Dual Uplink

For the MSD analysis based on Inter-modulation problems by dual uplink for PC 2 DC band combinations, the present specification uses simulations based on parameters shown in Table 22 and Table 23.

The present specification provides analysis of the required MSD values in the own Rx band by IMD product from dual uplink transmission. In Table 22 and Table 23, examples of the basic RF simulation assumptions are shown.

TABLE 22

| | Diplexer Architecture w/single ant. PC2 for DC_2A_n77A, DC_5A_n77A, DC_13A_n77A and DC_66A_n77A | | | |
|---|---|---|---|---|
| UE ref. architecture Component | IP2 (dBm) | IP3 (dBm) | IP4 (dBm) | IP5 (dBm) |
| Ant. Switch | 112 | 68 | 55 | 55 |
| Triplexer | 110 | 72 | 55 | 52 |
| Diplexer | 115 | 87 | 55 | 55 |
| Duplexer | 100 | 75 | 55 | 53 |
| PA Forward | 28.0 | 32 | 30 | 28 |
| PA Reversed | 40 | 30.5 | 30 | 30 |
| LNA | 10 | 0 | 0 | −10 |

Table 22 shows an example of UE RF Front-end component parameters

Here, IP n may mean an nth order intercept point. For example, IP4 is a 4th order intercept point. LNA may mean a low noise amplifier. PA may mean a power amplifier.

By using simulation based on UE reference architecture and the RF component parameters in Table 16, the IMD problem and MSD for various DC band combinations are analyzed.

TABLE 23

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| Triplexer | 20 | High/low band isolation |
| Diplexer | 25 | High/low band isolation |
| PA (out) to PA (out) | 60 | L-H/H-L cross-band |
| PA (out) to PA (out) | 50 | H-H cross-band |

TABLE 23-continued

| Isolation Parameter | Value (dB) | Comment |
|---|---|---|
| LNA (in) to PA (out) | 60 | L-H/H-L cross-band |
| LNA (in) to PA (out) | 50 | H-H cross-band |
| Duplexer | 50 | Tx band rejection at Rx band |

Table 23 shows an example of an isolation levels according to the RF component of a UE to analyze IMD and derive MSD level.

Table 23 shows an example of UE RF Front-end component isolation parameters.

Table 24 shows an example of conventionally existed MSD levels.

TABLE 24

| | NR or E-UTRA Band/Channel bandwidth/$N_{RB}$/MSD | | | | | | |
|---|---|---|---|---|---|---|---|
| EN-DC Configuration | EUTRA or NR band | UL $F_c$ (MHz) | UL/DL BW (MHz) | UL $L_{CRB}$ | DL $F_c$ (MHz) | MSD (dB) | IMD order |
| DC_2A_n78A DC_2A_n78(2A) | 2 | 1855 | 5 | 25 | 1935 | 26 28.7 | IMD2 |
| | n78 | 3790 | 10 | 50 | 3790 | N/A | N/A |
| DC_2A_n78A DC_2A_n78(2A) | 2 | 1885 | 5 | 25 | 1965 | 8.0 10.7 | IMD4 |
| | n78 | 3690 | 10 | 50 | 3690 | N/A | N/A |
| DC_5A_n78A DC_5A_n78(2A) | 5 | 844 | 5 | 25 | 889 | 8.3 | IMD4 |
| | n78 | 3421 | 10 | 50 | 3421 | N/A | N/A |
| DC_66A_n78A | 66 | 1730 | 5 | 25 | 2150 | 5.0 | IMD5 |
| | n78 | 3660 | 10 | 50 | 3660 | N/A | N/A |

Table 24 shows an example of MSD test requirements for PC3 EN-DC in NR FR1 (two bands).

As described above, based on the simulation based on Tables 20 to 22, the IMD problem and MSD for the various DC band combinations are analyzed.

For example, for the worst case where the impact of IMD on downlink operating band in the various DC band combinations, simulations based on Tables 20 to 22 are performed. The IMD and MSD analysis are performed according to the simulations performed, and the MSD values determined according to the analysis results are shown in Table 25. For example, based on above assumptions and test configuration, the MSD levels are proposed as below.

TABLE 25

| DC bands | UL DC | IMD | UL $F_c$ (MHz) | UL BW (MHz) | UL RB # | DL $F_c$ (MHz) | DL BW (MHz) | MSD (dB) |
|---|---|---|---|---|---|---|---|---|
| DC_2A_n77A | 2 | IMD2 | 1855 | 5 | 25 | 1935 | 5 | 32.6 |
| | n77 | $|f_{B2} - f_{n77}|$ | 3790 | 10 | 50 | 3790 | 10 | N/A |
| | 2 | IMD4 | 1885 | 5 | 25 | 1965 | 5 | 17.5 |
| | n77 | $|3*f_{B2} - f_{n77}|$ | 3690 | 10 | 50 | 3690 | 10 | N/A |
| DC_5A_n77A | 5 | IMD4 | 844 | 5 | 25 | 889 | 5 | 17.7 |
| | n77 | $|3*f_{B5} - f_{n77}|$ | 3421 | 10 | 50 | 3421 | 10 | N/A |
| DC_13A_n77A | 13 | IMD5 | 782 | 5 | 25 | 751 | 5 | 11.3 |
| | n77 | $|4*f_{B13} - f_{n77}|$ | 3879 | 10 | 50 | 3879 | 10 | N/A |
| DC_66A_n77A | 66 | IMD2 | 1730 | 5 | 25 | 2130 | 5 | 34.6 |
| | n77 | $|f_{B66} - f_{n77}|$ | 3860 | 10 | 50 | 3860 | 10 | N/A |
| | 66 | IMD5 | 1730 | 5 | 25 | 2130 | 5 | 10.8 |
| | n77 | $|3*f_{B66} - 2*f_{n77}|$ | 3660 | 10 | 50 | 3660 | 10 | N/A |

In Table 25, Fc means a center frequency. For example, UL Fc may mean the center frequency of the uplink operating band or the center frequency of the CC in the uplink operating band.

Table 25 shows an example of MSD test configuration and results derived based on IMD problems. Table 25 shows MSD values applicable to various DC band combinations. MSD values in Table 25 table may be considered to specify the MSD requirements.

For reference, ±α tolerance may be applied to the MSD values shown in the Table 25. α may be 0, 0.1, 0.2, 0.3, 0.4, 0.5, 0.6, 0.7, . . . 2.7. For an example, for DC band combination of DC_2A_n77A downlink band and DC_2A_n77A uplink band, the MSD value may be 32.6±α on downlink band n77

The reception performance of the UE can be tested by applying the MSD values in Table 25 to the reference sensitivity of the downlink operating band of the various EN-DC band combinations. In other words, the MSD values in Table 25 may be applied to the reference sensitivity of the downlink operating band of the various EN-DC band combinations and may be used when the reception performance of the UE is tested. The transceiver (or receiver) of the UE that passed the test satisfies the minimum requirements based on the reference sensitivity to which the MSD values in Table 25 apply.

Based on simulation results explained in First Example of the Disclosure of the Present Specification, MSD levels are proposed as the following:

For cross-band isolation issue of PC2 DC UE, the MSD values in Table 21 are proposed; and For IMD problem by dual uplink transmission, the MSD values in Table 25 are proposed.

2. Second Example of the Disclosure of the Present Specification

Hereinafter, self-interference for PC2 UE configured with NR inter-band CA is analyzed. PC2 UE configured with NR inter-band CA may be referred to PC2 NR inter-band CA UE. Various combinations of downlink operating bands and uplink operating bands in the second example of the disclosure of the present specification may be used for the inter-band CA. For example, for NR inter-band CA, combinations of two NR operating bands may be used. Based on the combinations of two NR operating bands, a UE may be configured to use 2 uplink operating bands (two NR operating bands) and 2 downlink operating bands (two NR operating bands). For example, one NR FDD operation band and one NR TDD operation band may be used as NR inter-band CA band combination.

Conventionally, the impact of harmonics, IMD, and/or cross band isolations on some combinations in the CA case (for example, NR inter-band CA case) has not been analyzed and the MSD values for the combinations in the CA case have not been discussed. For example, the impact of the harmonics and/or IMD for a combination of CA cases of Table 26, which will be described later, is not analyzed, and the MSD values have not been discussed.

In the NR inter-band CA case, the UE may perform dual uplink transmission through two uplink operating bands. In this case, the MSD value for analyzing the impact of the harmonics and/or IMD occurring in the downlink operating bands and relaxing the REFSENS specification needs to be proposed.

Hereinafter, the impact of the harmonics, IMD, and/or cross band isolations in the NR inter-band CA case based on the NR inter-band CA combinations is analyzed. In addition, the MSD value for relaxing the RESENS specification based on the analyzed results is proposed.

For example, self-interference (for example, harmonics, IMD, and/or cross band isolations) occurring in the UE, which is configured with NR inter-band CA (two NR operation bands), may be analyzed. In addition, the MSD value may be set based on the analyzed self-interference, and a reference sensitivity specification, which is relaxed due to the MSD, may be defined.

In other words, in the present disclosure, for the UE, which configured with the NR inter-band CA may be analyzed. In addition, in the present disclosure, the maximum sensitivity degradation (MSD) value may be proposed in consideration of a radio frequency (RF) structure in a combination of bands in which the impact of self-interference is analyzed. The proposed MSD makes it possible to make exceptions to the reference sensitivity of the band (for example, to relax the REFSENS based on the MSD value). The reference sensitivity to which the exceptions are applied during the UE test may be applied to the UE, and the UE may pass the UE test based on the applied reference sensitivity.

As described above, for the combination of the UL operating band and the DL operating band having the self-interference problem, the MSD needs to be determined.

For the NR inter-band CA band combinations, the MSD for one downlink band affected by the harmonic and/or IMD occurring during the dual uplink transmission based on two UL operating bands may be provided below.

Table 26 below shows an example of NR inter-band CA band combinations associated with the self-interference problem. For example, Table 26 summarizes the NR inter-band CA band combinations with self-interference problems for NR inter-band CA operation for PC2 UE. In detail, Table 26 shows an example of self-interference analysis for two NR TDD operation bands NR inter-band CA operation.

TABLE 26

| Downlink band configuration | Uplink DC Configuration | Harmonic relation issues | intermodulation to own rx band | interference due to small frequency separation | MSD |
|---|---|---|---|---|---|
| CA_n3A-n78A | CA_n3A-n78A | $2^{nd}$ harmonic from n3 fall into n78. But TDD band only allow Tx or Rx in the same time -> No issue | $2^{nd}$, $4^{th}$ & $5^{th}$ IMDs fall into n3 | No cross band isolation issues | Need to study $2^{nd}$ harmonic mixing from n78 into n3. Follow 31.9 dB/ 18.5 dB MSD by $2^{nd}/4^{th}$ IMDs of DC_3A_n78A MSD valus for PC2 |

TABLE 26-continued

| Downlink band configuration | Uplink DC Configuration | Harmonic relation issues | intermodulation to own rx band | interference due to small frequency separation | MSD |
|---|---|---|---|---|---|
| | | Harmonic mixing issue can be considered with 26 dBm from n78 into n3 | | | in TS38.101-3 V16.5.0. |
| CA_n25A-n41A | CA_n25A-n41A | No harmonic problem or harmonic mixing between two band | No IMD problem into n25 No IMD problem into n41 | Need to define MSD for cross band isolation issue in n25 | 0.6 dB MSD value for PC3 was defined. -> follow same MSD values (2.3 dB) of PC2 DC_2A_n41A |
| CA_n41A-n71A | CA_n41A-n71A | $4^{th}$ harmonic from n71 fall into n41 But TDD band only allow Tx or Rx in the same time -> No issue $4^{th}$ harmonic mixing issue can be considered with 26 dBm from n41 can impact to n71 | $4^{th}$ IMD fall into n71 | No cross band isolation issues | Need to study $4^{th}$ harmonic mixing impact on the n71 reception for both PC3 and PC2. 11.0 dB was defined for PC3 UE. Need to study MSD value by $4^{th}$ IMD for PC2 UE |
| CA_n41A-n66A | CA_n41A-n66A | No harmonic problem between two band | No IMD problem into n66 $4^{th}$ IMD fall into n41. But TDD band only allow Tx or Rx in the same time -> No issue | Need to define MSD for cross band isolation issue in n66 | 3.5 dB MSD value for PC3 was defined. -> follow same MSD values (5.3 dB) of PC2 DC_66A_n41A. |
| CA_n40A-n79A | CA_n40A-n79A | $2^{nd}$ harmonic from n40 fall into n79. But TDD band only allow Tx or Rx in the same time -> No issue $2^{nd}$ harmonic mixing issue can be considered with 26 dBm from n79 fall into n40 | $2^{nd}$, $4^{th}$ & $5^{th}$ IMDs fall into n40. Also $4^{th}$ & $5^{th}$ IMDs fall into n79. But TDD band only allow Tx or Rx in the same time -> No issue | No cross band isolation issues | Need to study $2^{nd}$ harmonic mixing impact on the n40 reception for both PC3 and PC2. |
| CA_n3A-n79A | CA_n3A-n79A | No harmonic problem between two band | $5^{th}$ IMDs fall into n3. $4^{th}$ IMD fall into n79. But TDD band only allow Tx or Rx in the same time -> No issue | No cross band isolation issues | No issue |
| CA_n40A-n78A | CA_n40A-n78A | No harmonic problem between two band | $4^{th}$ IMD fall into n40 & n78. But TDD band only allow Tx or Rx in the same time -> No issue | Need to define MSD for cross band isolation issue in Band 40 | 4.5 dB MSD value for PC3 was defined. -> follow same MSD values (6.5 dB) of PC2 DC_7A_n78A. |

TABLE 26-continued

| Downlink band configuration | Uplink DC Configuration | Harmonic relation issues | intermodulation to own rx band | interference due to small frequency separation | MSD |
|---|---|---|---|---|---|
| CA_n2A-n77A | CA_n2A-n77A | $2^{nd}$ harmonic from n2 fall into n77. But TDD band only allow Tx or Rx in the same time -> No issue $2^{nd}$ harmonic mixing issue can be considered with 26 dBm from n77 fall into n2 | $2^{nd}$, $4^{th}$ & $5^{th}$ IMDs fall into n2 $4^{th}$ & $5^{th}$ IMDs fall into n77. But TDD band only allow Tx or Rx in the same time -> No issue | No cross band isolation issues | Need to study $2^{nd}$ harmonic mixing impact on the n2 reception for both PC3 and PC2. 26.0 dB/8.0 dB MSD values by $2^{nd}$/$4^{th}$ IMD are specified for PC3 DC_2A_n78A UE. -> need to define new MSD values by $2^{nd}$ & $4^{th}$ IMD for PC2 UE |
| CA_n5A-n77A | CA_n5A-n77A | $4^{th}$ & $5^{th}$ harmonics from n5 fall into n77. But TDD band only allow Tx or Rx in the same time -> No issue $4^{th}$ harmonic mixing issue can be considered with 26 dBm from n77 fall into n5 | $4^{th}$ & $5^{th}$ IMDs fall into n5 $2^{nd}$ & $5^{th}$ IMDs fall into n77. But TDD band only allow Tx or Rx in the same time -> No issue | No cross band isolation issues | Need to study $4^{th}$ harmonic mixing impact on the n5 reception for both PC3 and PC2. 8.3 dB MSD value by $4^{th}$ IMD is specified for PC3 DC_5A_n78A UE. -> need to define new MSD values by $4^{th}$ & $5^{th}$ IMD for PC2 UE |
| CA_n66A-n77A | CA_n66A-n77A | $2^{nd}$ harmonic from n66 fall into n77. But TDD band only allow Tx or Rx in the same time -> No issue $2^{nd}$ harmonic mixing issue can be considered with 26 dBm from n77 fall into n66 | $2^{nd}$ & $5^{th}$ IMDs fall into n66. $4^{th}$ & $5^{th}$ IMDs fall into n77. But TDD band only allow Tx or Rx in the same time -> No issue | No cross band isolation issues | Need to study $2^{nd}$ harmonic mixing impact on the n66 reception for both PC3 and PC2. 5.0 dB MSD value by $5^{th}$ IMD is specified for PC3 DC_66A_n78A UE. -> need to define new MSD values by $2^{nd}$ & $5^{th}$ IMDs for PC2 UE |
| CA_n25A-n77A | CA_n25A-n77A | $2^{nd}$ harmonic from n25 fall into n77. But TDD band only allow Tx or Rx in the same time -> No issue $2^{nd}$ harmonic mixing issue can be considered with 26 dBm from n77 fall into n25 | $2^{nd}$, $4^{th}$ & $5^{th}$ IMDs fall into n25 $4^{th}$ & $5^{th}$ IMDs fall into n77. But TDD band only allow Tx or Rx in the same time -> No issue | No cross band isolation issues | Need to study $2^{nd}$ harmonic mixing impact on the n25 reception for both PC3 and PC2. 26.0 dB/8.0 dB MSD values by $2^{nd}$/$4^{th}$ IMD are specified for PC3 DC_2A_n78A UE. -> can follow MSD req. for DC_2A_n77A PC2 UE |
| CA_n41A-n77A | CA_n41A-n77A | No harmonic problem between two band | $4^{th}$ IMDs fall into n41. $3^{rd}$ & $4^{th}$ IMDs fall into n77. But TDD band only allow Tx or Rx in the same time -> No issue | Need to define MSD for cross band isolation issue in n41 and n77 | Fot cross band isolation, 4.5 dB for n41 was defined for PC3 UE 8.3 dB for n77 were defiend for PC3 UE -> need to define new MSD values for PC2 UE |

TABLE 26-continued

| Downlink band configuration | Uplink DC Configuration | Harmonic relation issues | intermodulation to own rx band | interference due to small frequency separation | MSD |
|---|---|---|---|---|---|
| CA_n71A-n77A | CA_n71A-n77A | $5^{th}$ & $6^{th}$ harmonic from n71 fall into n77. But TDD band only allow Tx or Rx in the same time -> No issue $5^{th}$ harmonic mixing issue can be considered with 26 dBm from n77 fall into n71 | $5^{th}$ IMDs fall into n71. $2^{nd}$ IMD fall into n77. But TDD band only allow Tx or Rx in the same time -> No issue | No cross band isolation issues | Need to study $5^{th}$ harmonic mixing impact on the n71 reception for both PC3 and PC2. 5.5 dB for DC_71A_n78A by IMD5 was defiend for PC3 UE -> need to define new MSD values for PC2 UE |

Alphabets (A, B, C, D, and the like) after the number in Table 26 refer to a bandwidth class described in the example of Table 11 and Table 12.

According to examples in Table 26, there are harmonic mixing problem, cross band isolation issues and IMD problems to the own Rx band when dual uplink is applied for PC2 NR inter-band CA UE. Hence, Second Example of the Disclosure of the Present Specification may defined the MSD requirements for PC2 NR inter-band CA combinations.

Referring to Table 26, the self-interference problem of various DC band combinations is needed to be analyzed in the present specification. That is, the MSD values for various EN-DC band combinations are not defined yet.

Figure 12:
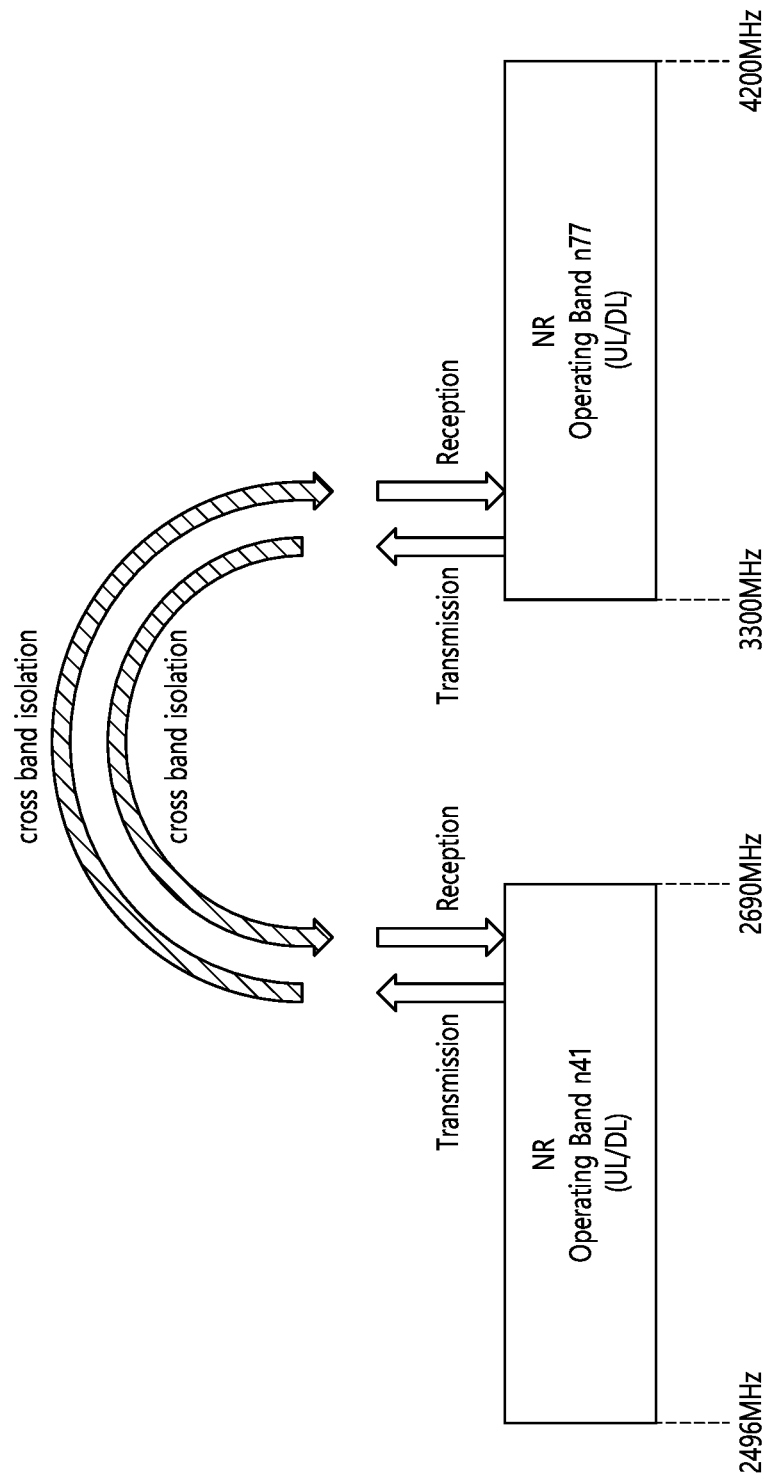
FIG. 12 illustrates an example of cross-band isolation issue for PC2 inter-band CA with band combination of NR operating band n41 and n77.
Figure 13:
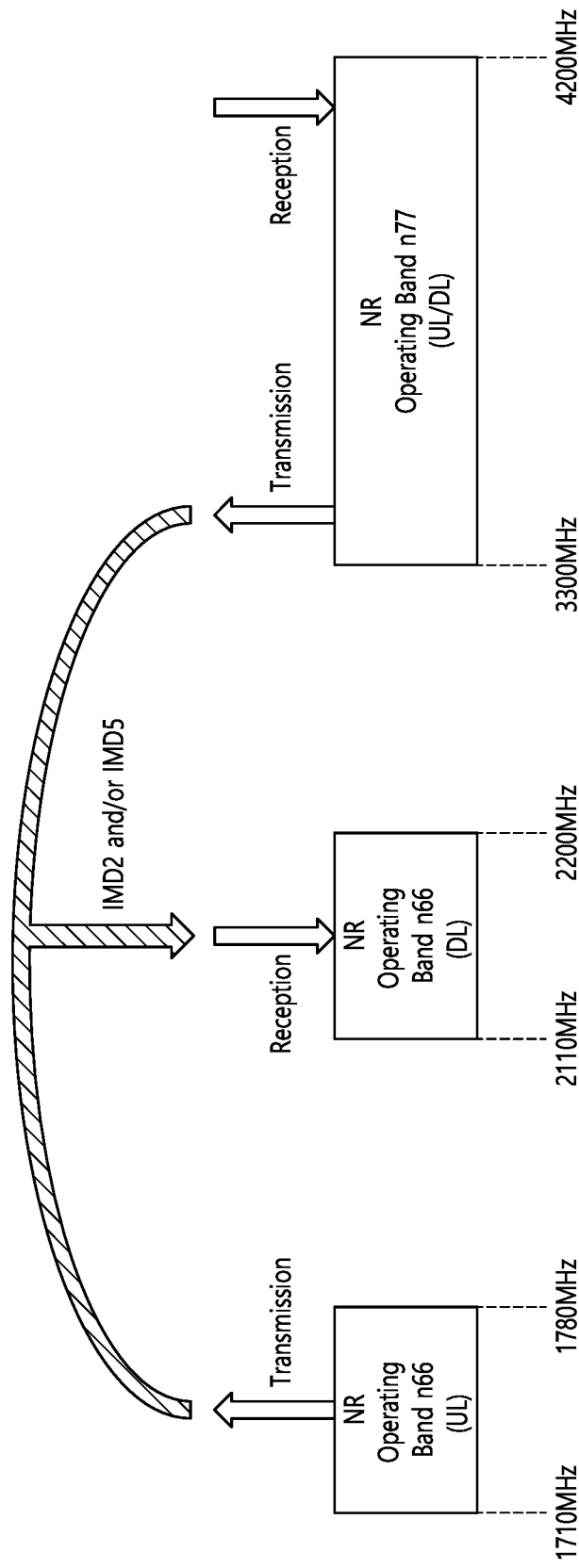
FIG. 13 illustrates an example of IMD issue for PC2 inter-band CA with band combination of downlink bands n77, n66 and uplink bands n77, n66.

FIG. 12 shows an example of cross-band isolation issue according to Table 26. FIG. 13 shows an example of IMD issue according to Table 26.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 12 illustrates an example of cross-band isolation issue for PC2 inter-band CA with band combination of NR operating band n41 and n77.

FIG. 12 shows an example of self interference (e.g. cross band isolations) affecting the downlink band n77 for PC2 inter-band CA with band combination NR operating band n41, and n77. For example, the cross band isolations affecting the E-UTRA downlink band n77 in the PC2 inter-band CA combination of NR operating band n41, and n77.

Also FIG. 12 shows an example of self interference (e.g. cross band isolations) affecting the downlink band n41 for PC2 inter-band CA with band combination NR operating band n41, and n77. For example, the cross band isolations affecting the E-UTRA downlink band n41 in the PC2 inter-band CA combination of NR operating band n41, and n77.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 13 illustrates an example of IMD issue for PC2 inter-band CA with band combination of downlink bands n77, n66 and uplink bands n77, n66.

FIG. 13 shows an example of self interference (e.g. IMD 2 and/or IMD5) affecting the downlink band n66 for PC2 inter-band CA with band combination downlink bands n77, n66 and uplink bands n77, n66. For example, the IMD 2 and/or 5 affecting the downlink band n66 in the combination of CA_n66A_n77A downlink band and CA_n66A_n77A uplink band.

Referring to FIG. 13, a $2^{nd}$ order IMD (IMD 2) and/or 5th order IMD (IMD 5) component of an uplink signal transmitted in the uplink band n77 and an uplink signal transmitted in the uplink band n66 may fall into a frequency range of the downlink band n66.

The worst case, where the impact of the IMD 2 within the frequency range of the downlink band n66 is greatest, is the case where a center frequency of the uplink band n77 is 3860 MHz, a center frequency of the uplink operating band n66 is 1730 MHz, and a center frequency of the downlink operating band n66 is 2130 MHz. In this case, since 3860−1730=2130, the frequency of the IMD2 component of the uplink bands n66 and n77 coincides with the center frequency of the downlink band n66.

The worst case, where the impact of the IMD 5 within the frequency range of the downlink band n66 is greatest, is the case where a center frequency of the uplink band n77 is 3660 MHz, a center frequency of the uplink operating band n66 is 1730 MHz, and a center frequency of the downlink operating band n66 is 2130 MHz. In this case, since 3660*2−1730*3=2130, the frequency of the IMD5 component of the uplink bands n66 and n77 coincides with the center frequency of the downlink band n66.

For example, for NR inter-band CA band combination of the CA_n41A-n71A downlink band and the CA_n41A-n71A uplink band, 4th harmonic mixing issue and/or $4^{th}$ IMD issue in NR operating band n71 are not analyzed previously. For example, for NR inter-band CA band combination of the CA_n40A-n79A downlink band and the CA_n40A-n79A uplink band, 2nd harmonic mixing issue in NR operating band n40 is not analyzed previously. For example, for NR inter-band CA band combination of the CA_n2A-n77A downlink band and the CA_n2A-n77A uplink band, 2nd harmonic mixing issue in NR operating band n2 and/or 2nd IMD and 4th IMD issue in NR operating band n2 is not analyzed previously. For example, for NR inter-band CA band combination of the CA_n5A-n77A downlink band and the CA_n5A-n77A uplink band, 4th harmonic mixing issue in NR operating band n5 and/or 4th IMD issue and 5th IMD issue in NR operating band n5 is not analyzed previously. For example, for NR inter-band CA band combination of the CA_n66A-n77A downlink band and the CA_n66A-n77A uplink band, 2nd harmonic mixing issue in NR operating band n66 and/or 2nd IMD issue and 5th IMD issue in NR operating band n66 is not analyzed previously. For example, for NR inter-band CA band combination of the CA_n41A-n77A downlink band and the CA_n41A-n77A uplink band, cross band isolation issue in NR operating band n41 and n77 is not analyzed previously. For example, for NR inter-band CA band combination of the CA_n71A-n77A downlink band and the CA_n71A-n77A uplink band, 5th harmonic mixing issue in NR operating band n71 and/or 5th IMD issue in NR operating band n71 is not analyzed previously.

Hereinafter, analysis for PC2 NR inter-band CA band combinations are described.

1) Analysis Based on Cross Band Isolation Issues

Table 27 shows examples of the MSD requirements, which were conventionally defined, for cross band isolation issues for power class 3 DC UE with LTE 1 FDD band and NR 1 TDD band combinations.

Table 27 shows examples of Reference sensitivity exceptions (e.g. MSD) due to cross band isolation for PC3 EN-DC in NR FR1.

The following NOTEs 1 to 5 are applied to examples of Table 27.

NOTE 1: Applicable only when harmonic mixing MSD for this combination is not applied. Herein, harmonic mixing may mean that additional non-linear source will be generated by the reciprocal of fundamental signal frequency (fc) such as $\frac{1}{2}$ fc, $\frac{1}{4}$*fc, $\frac{1}{8}$*fc elements.

NOTE 2: The B41 requirements (requirements related to E-UTRA operating band 41) are modified by −0.5 dB when carrier frequency of the assigned E-UTRA channel bandwidth is within 2515-2690 MHz.

NOTE 3: These requirements apply when the uplink is active in NR Band n1, n84 and the separation between the lower edge of the uplink channel in Band n1, n84 and the upper edge of the downlink channel in Band 3 is <60 MHz. For each channel bandwidth in Band 3, the requirement applies regardless of channel bandwidth in Band n1, n84.

TABLE 27

E-UTRA or NR Band/Channel bandwidth of the affected DL band/MSD

| UL band | DL band | 5 MHz (dB) | 10 MHz (dB) | 15 MHz (dB) | 20 MHz (dB) | 25 MHz (dB) | 30 MHz (dB) | 40 MHz (dB) | 50 MHz (dB) | 60 MHz (dB) | 70 MHz (dB) | 80 MHz (dB) | 90 MHz (dB) | 100 MHz (dB) |
|---|---|---|---|---|---|---|---|---|---|---|---|---|---|---|
| n1 (Note 3) | 3 | 3 | 2.3 | 2 | 1.8 | | | | | | | | | |
| n1 | 40 | 6.6 | 6.6 | 6.6 | 6.6 | | | | | | | | | |
| 1 (Note 3) | n3 | 3 | 2.2 | 1.9 | 1.7 | 1.6 | 1.5 | 1.4 | | | | | | |
| 1 | n40 | 6.6 | 6.6 | 6.6 | 6.6 | 6.6 | 6.6 | 6.6 | 6.6 | 6.6 | | 6.6 | | |
| 1 | n41 | | 6.1 | 6.1 | 6.1 | | 6.1 | 6.1 | 6.1 | 6.1 | | 6.1 | 6.1 | 6.1 |
| n3 | 11 | 6.4 | 6.1 | | | | | | | | | | | |
| 3 | n41 | | 0.7 | 0.7 | 0.7 | | 0.7 | 0.7 | 0.7 | 0.7 | | 0.7 | 0.7 | 0.7 |
| 3 | n51 | 6.4 | | | | | | | | | | | | |
| 30 | n66 | 8.3 | 8.3 | 8.3 | 8.3 | 8.3 | 8.3 | 8.3 | | | | | | |
| n3 | 41 | 0.7 | 0.7 | 0.7 | 0.7 | | | | | | | | | |
| n5 | 28 | 4.5 | 3 | 2.2 | 0.3 | | | | | | | | | |
| 7 | n40 | 3.7 | 3.4 | 3.2 | 3.1 | 3.1 | 3.1 | 3.1 | 3.1 | 3.1 | | 3.1 | | |
| n38 | 1 | 1.9 | 1.9 | 1.9 | 1.9 | | | | | | | | | |
| n38 | 2 | 0.6 | 0.6 | 0.6 | 0.6 | | | | | | | | | |
| n38 | 4 | 1.9 | 1.9 | 1.9 | 1.9 | | | | | | | | | |
| n38 | 66 | 1.9 | 1.9 | 1.9 | 1.9 | | | | | | | | | |
| n40 | 1 | 8.3 | 8.3 | 8.3 | 8.3 | | | | | | | | | |
| n41 | 4 | 3.5 | 3.5 | 3.5 | 3.5 | | | | | | | | | |
| 40 | n1 | 8.3 | 8.3 | 8.3 | 8.3 | 8.3 | 8.3 | 8.3 | | | | | | |
| n40 | 7 | 3.7 | 3.7 | 3.7 | 3.7 | | | | | | | | | |
| n41 | 1 | 9.1 | 9.1 | 9.1 | 9.1 | | | | | | | | | |
| n41 | 2 | 0.6 | 0.6 | 0.6 | 0.6 | | | | | | | | | |
| n41 | 3 | 0.6 | 0.6 | 0.6 | 0.6 | | | | | | | | | |
| 41 | n3 | 0.6 | 0.6 | 0.6 | 0.6 | 0.6 | 0.6 | 0.6 | | | | | | |
| n41 | 66 (Note 1) | 3.5 | 3.5 | 3.5 | 3.5 | | | | | | | | | |
| n41 | 25 | 0.6 | 0.6 | 0.6 | 0.6 | | | | | | | | | |
| n50 | 3 | 2.5 | 1.9 | 1.6 | 1.5 | | | | | | | | | |
| n77 | 7 (Note 1) | 4.5 | 4.5 | 4.5 | 4.5 | | | | | | | | | |
| n77 | 41 (Note 1) | 4.5 | 4.5 | 4.5 | 4.5 | | | | | | | | | |
| 41 | n77 | | 8.3 | 8.3 | 8.3 | 7.3 | 6.5 | 6.3 | 5.3 | 4.5 | 4.3 | 4.0 | 3.9 | 3.8 |
| n78 | 7 (Note 1) | 4.5 | 4.5 | 4.5 | 4.5 | | | | | | | | | |
| n78 | 38 | 3.3 | 3.3 | 3.3 | 3.3 | | | | | | | | | |
| n78 | 41 (Note 1) | 4.5 | 4.5 | 4.5 | 4.5 | | | | | | | | | |
| n78 | 46 | | | | 7 | | | | | | | | | |
| 41 | n78 | | 8.3 | 8.3 | 8.3 | 7.3 | 6.5 | 6.3 | 5.3 | 4.5 | 4.3 | 4.0 | 3.9 | 3.8 |
| n84 (Note 3) | 3 | 3 | 2.3 | 2 | 1.8 | | | | | | | | | |

NOTE 4: The DL victim band should be configured using the lowest SCS that is compatible with the highest CBW for which an MSD is specified.

NOTE 5: MSD test point can be chosen according to supported BW and lowest SCS supported by the UE.

In here, power combination of 23 dBm+23 dBm or power combination of 26 dBm+26 dBm for PC2 NR inter-band CA UE are allowed.

Based on examples of MSD values of Table 27, we analyse the MSD value for CA_n41_n25, CA_n41_n66, CA_n78_n40, CA_n77_n41, CA_n41_n77 with follow simulation assumptions. For example, based on the specified MSD value in Table 27, the present specification analyse the MSD value for the PC2 CA_n41A-n77A UE with follow simulation assumptions in Table 28 and Table 29.

TABLE 28

| Band n77 PA noise @NR n41 Rx (dBm/Hz) | −115 |
|---|---|
| RFIC IIP2 (dBm) | 50 |
| n77 front end filter Loss (dB) | 4 |
| n41 front end filter Loss (dB) | 4 |
| PA to antenna and LNA to antenna IL (dB) | 4 |
| n77/n41 diplexer isolation (dB) | 10 |
| n77 filter attenuation @ n41 RX (dB) | 30 |
| Cross-band isolation (dB) (n77 Tx −> n41 Rx) | 40 |
| Rx Antenna isolation (dB) | 10 |

Table 28 shows n41 reception impact analysis parameters. Table 28 shows simulation assumptions for MSD requirements, which is for inter-band CA band combination n41A and n77A.

TABLE 29

| Band n41 PA noise @n77 Rx (dBm/Hz) | −115 |
|---|---|
| RFIC IIP2 (dBm) | 50 |
| n41 front end filter Loss (dB) | 4 |
| n77 front end filter Loss (dB) | 4 |
| PA to antenna and LNA to antenna IL (dB) | 4 |
| n77/n41 diplexer isolation (dB) | 10 |
| n41 filter attenuation @ n77 RX (dB) | 27 |
| Cross-band isolation (dB) (n41 Tx −> n77 Rx) | 38 |
| Rx Antenna isolation (dB) | 10 |

Table 29 shows n77 reception impact analysis parameters. Table 297 shows simulation assumptions for MSD requirements, which is for inter-band CA band combination n41A and n77A.

In examples of Table 28 and Table 29, PA may mean a power amplifier. RFIC IIP2 (input $2^{nd}$ order intercept point) may mean the expected input IP2 level of Radio Frequency Integrated Circuits (RFIC) in data sheet or measured level. LNA may mean a low noise amplifier.

By performing simulation based on the simulation assumptions for PC2 inter-band CA in Table 28 and Table 29, the cross band isolations and MSD for various inter-band CA band combinations are analyzed.

Based on the above simulation assumptions, the MSD values are derived as follow by using MRC combining.

Table 30 shows derived MSD values due to cross band isolation for PC2 for DC band combinations for power combination of 23 dBm+23 dBm or 26 dBm+26 dBm for PC2 NR inter-band CA UE. Herein, 23 dBm+23 dBm may mean that maximum output power of 23 dBm is used for NR operating bands and 26 dBm+26 dBm may mean that maximum output power of 26 dBm is used for NR operating bands.

TABLE 30

| | | NR Band/Channel bandwidth of the affected DL band/MSD | | | | | | | | | | | | |
|---|---|---|---|---|---|---|---|---|---|---|---|---|---|---|
| UL band | DL band | 5 MHz (dB) | 10 MHz (dB) | 15 MHz (dB) | 20 MHz (dB) | 25 MHz (dB) | 30 MHz (dB) | 40 MHz (dB) | 50 MHz (dB) | 60 MHz (dB) | 70 MHz (dB) | 80 MHz (dB) | 90 MHz (dB) | 100 MHz (dB) |
| n41 | n25 | 2.3 | 2.3 | 2.3 | 2.3 | | | | | | | | | |
| n41 | n66 | 5.3 | 5.3 | 5.3 | 5.3 | | | | | | | | | |
| n78 | n40 | 6.5 | 6.5 | 6.5 | 6.5 | | | | | | | | | |
| n77 | n41 | 6.5 | 6.5 | 6.5 | 6.5 | | | | | | | | | |
| n41 | n77 | | 10.5 | 10.5 | 10.5 | 9.5 | 8.6 | 8.3 | 7.2 | 6.3 | 6.0 | 5.7 | 5.6 | 5.6 |

In Table 30, 5 Mhz, 10 MHz, 15 MHz, . . . may mean channel bandwidth of the affected DL band.

For example, PC2 UE may be configured with inter-band CA based on CA band combination of NR operating band n77 and n41. If downlink band n41 and uplink band n77 are configured for the UE, when downlink channel bandwidth is configured to be one of 5 MHz, 10 MHz, 15 MHz, or 20 MHz, MSD value is configured to be 6.5 dB. The MSD value may be applied to reference sensitivity used for receiving downlink signal.

For example, PC2 UE may be configured with inter-band CA based on CA band combination of NR operating band n41 and n77. If downlink band n77 and uplink band n41 are configured for the UE, when downlink channel bandwidth is configured to be one of 10 MHz, 15 MHz, 20 MHz, 25 MHz, . . . , or 100 MHz, MSD value is configured to be the value corresponding to the downlink channel bandwidth in Table 30. For example, when downlink channel bandwidth is configured to be 100 MHz, the MSD value is 5.6 dB. The MSD value may be applied to reference sensitivity used for receiving downlink signal.

For reference, ±α tolerance may be applied to the MSD values shown in the Table 30. α may be 0, 0.1, 0.2, 0.3, 0.4, 0.5, 0.6, 0.7, . . . 2.7. For example, MSD values proposed in the present specification may include MSD value to which the ±α tolerance is applied.

The reception performance of the UE can be tested by applying the MSD values in Table 30 to the reference sensitivity of the downlink operating band of the various CA band combinations. In other words, the MSD values in Table 30 may be applied to the reference sensitivity of the downlink operating band of the various CA band combinations and may be used when the reception performance of the UE is tested. The transceiver (or receiver) of the UE that passed the test satisfies the minimum requirements based on the reference sensitivity to which the MSD values in Table 30 apply.

2) Analysis Based on Inter-Modulation Problems by Dual Uplink

For the MSD analysis based on Inter-modulation problems by dual uplink for PC 2 inter-band CA band combinations, the present specification uses simulations based on parameters shown in Table 31 and Table 32.

The present specification provides analysis of the required MSD values in the own Rx band by IMD product from dual uplink transmission. In Table 31 and Table 32, examples of the basic RF simulation assumptions are shown.

TABLE 31

| UE ref. architecture Component | Diplexer Architecture w/single ant. PC2 for CA_n41A_n71A, CA_n2A_n77A, CA_n5A_n77A, CA_n66A_n77A and CA_n71A_n77A | | | |
|---|---|---|---|---|
| | IP2 (dBm) | IP3 (dBm) | IP4 (dBm) | IP5 (dBm) |
| Ant. Switch | 112 | 68 | 55 | 55 |
| Triplexer | 110 | 72 | 55 | 52 |
| Diplexer | 115 | 87 | 55 | 55 |
| Duplexer | 100 | 75 | 55 | 53 |
| PA Forward | 28.0 | 32 | 30 | 28 |
| PA Reversed | 40 | 30.5 | 30 | 30 |
| LNA | 10 | 0 | 0 | −10 |

Table 31 shows an example of UE RF Front-end component parameters

Here, IP n may mean an nth order intercept point. For example, IP4 is a 4th order intercept point. LNA may mean a low noise amplifier. PA may mean a power amplifier.

By using simulation based on UE reference architecture and the RF component parameters in Table 31, the IMD problem and MSD for various NR inter-band CA band combinations are analyzed.

TABLE 32

| Isolation Parameter | Value (dB) | Comment |
|---|---|---|
| Antenna to Antenna | 10 | Main antenna to diversity antenna |
| PA (out) to PA (in) | 60 | PCB isolation (PA forward mixing) |
| Triplexer | 20 | High/low band isolation |
| Diplexer | 25 | High/low band isolation |
| PA (out) to PA (out) | 60 | L-H/H-L cross-band |
| PA (out) to PA (out) | 50 | H-H cross-band |
| LNA (in) to PA (out) | 60 | L-H/H-L cross-band |
| LNA (in) to PA (out) | 50 | H-H cross-band |
| Duplexer | 50 | Tx band rejection at Rx band |

Table 32 shows an example of an isolation levels according to the RF component of a UE to analyze IMD and derive MSD level.

Table 32 shows an example of UE RF Front-end component isolation parameters.

Table 33 shows an example of conventionally existed MSD levels.

TABLE 33

NR or E-UTRA Band/Channel bandwidth/$N_{RB}$/MSD

| EN-DC Configuration | EUTRA or NR band | UL $F_c$ (MHz) | UL/DL BW (MHz) | UL $L_{CRB}$ | DL $F_c$ (MHz) | MSD (dB) | IMD order |
|---|---|---|---|---|---|---|---|
| DC_2A_n78A DC_2A_n78(2A) | 2 | 1855 | 5 | 25 | 1935 | 26 28.7 | IMD2 |
| | n78 | 3790 | 10 | 50 | 3790 | N/A | N/A |
| DC_2A_n78A DC_2A_n78(2A) | 2 | 1885 | 5 | 25 | 1965 | 8.0 10.7 | IMD4 |
| | n78 | 3690 | 10 | 50 | 3690 | N/A | N/A |
| DC_5A_n78A | 5 | 844 | 5 | 25 | 889 | 8.3 | IMD4 |
| DC_5A_n78(2A) | n78 | 3421 | 10 | 50 | 3421 | N/A | N/A |
| CA_n41A-n71A | n41 | 2614 | 5 | 25 | 2614 | N/A | N/A |
| | n71 | 665 | 5 | 25 | 619 | 11 | IMD4 |
| DC_66A_n78A | 66 | 1730 | 5 | 25 | 2150 | 5.0 | IMD5 |
| | n78 | 3660 | 10 | 50 | 3660 | N/A | N/A |
| DC_71A_n78A | 71 | 681.5 | 5 | 25 | 635.5 | 5.5 | IMD5 |
| | n78 | 3361.5 | 10 | 50 | 3582.5 | N/A | N/A |

Table 33 shows an example of MSD test requirements for PC3 EN-DC in NR FR1 (two bands).

As described above, based on the simulation based on Tables 29 to 31, the IMD problem and MSD for the various DC band combinations are analyzed.

For example, for the worst case where the impact of IMD on downlink operating band in the various NR inter-band CA band combinations, simulations based on Tables 29 to 31 are performed. The IMD and MSD analysis are performed according to the simulations performed, and the MSD values determined according to the analysis results are shown in Table 34. For example, based on above assumptions and test configuration, the MSD levels are proposed as below.

TABLE 34

| CA bands | UL band | IMD | UL $F_c$ (MHz) | UL BW (MHz) | UL RB# | DL $F_c$ (MHz) | DL BW (MHz) | MSD (dB) |
|---|---|---|---|---|---|---|---|---|
| CA_n41A-n71A | n41 | IMD4 | 2614 | 5 | 25 | 2614 | 5 | 18.2 |
| | n71 | $|3*f_{n71} - f_{n41}|$ | 665 | 5 | 25 | 619 | 5 | N/A |

TABLE 34-continued

| CA bands | UL band | IMD | UL $F_c$ (MHz) | UL BW (MHz) | UL RB# | DL $F_c$ (MHz) | DL BW (MHz) | MSD (dB) |
|---|---|---|---|---|---|---|---|---|
| CA_n2A-n77A | n2 | IMD2 | 1855 | 5 | 25 | 1935 | 5 | 32.6 |
| | n77 | $|f_{n2} - f_{n77}|$ | 3790 | 10 | 50 | 3790 | 10 | N/A |
| | n2 | IMD4 | 1885 | 5 | 25 | 1965 | 5 | 17.5 |
| | n77 | $|3*f_{n2} - f_{n77}|$ | 3690 | 10 | 50 | 3690 | 10 | N/A |
| CA_n5A-n77A | n5 | IMD4 | 844 | 5 | 25 | 889 | 5 | 17.7 |
| | n77 | $|3*f_{n5} - f_{n77}|$ | 3421 | 10 | 50 | 3421 | 10 | N/A |
| CA_n66A-n77A | n66 | IMD2 | 1730 | 5 | 25 | 2130 | 5 | 34.6 |
| | n77 | $|f_{n66} - f_{n77}|$ | 3860 | 10 | 50 | 3860 | 10 | N/A |
| | n66 | IMD5 | 1730 | 5 | 25 | 2130 | 5 | 10.8 |
| | n77 | $|3*f_{n66} - 2*f_{n77}|$ | 3660 | 10 | 50 | 3660 | 10 | N/A |
| CA_n71A-n77A | n71 | IMD5 | 681.5 | 5 | 25 | 635.5 | 5 | 12.2 |
| | n77 | $|4*f_{n71} - f_{n77}|$ | 3361.5 | 10 | 50 | 3582.5 | 10 | N/A |

In Table 34, Fc means a center frequency. For example, UL Fc may mean the center frequency of the uplink operating band or the center frequency of the CC in the uplink operating band.

Table 34 shows an example of MSD test configuration and results derived based on IMD problems. Table 34 shows MSD values applicable to various PC2 NR inter-band CA band combinations. MSD values in Table 34 may be considered to specify the MSD requirements.

For reference, ±α tolerance may be applied to the MSD values shown in the Table 34. α may be 0, 0.1, 0.2, 0.3, 0.4, 0.5, 0.6, 0.7, . . . 2.7.

For an example, for PC2 NR inter-band CA The reception performance of the UE can be tested by applying the MSD values in Table 34 to the reference sensitivity of the downlink operating band of the various CA band combinations. In other words, the MSD values in Table 34 may be applied to the reference sensitivity of the downlink operating band of the various CA band combinations and may be used when the reception performance of the UE is tested. The transceiver (or receiver) of the UE that passed the test satisfies the minimum requirements based on the reference sensitivity to which the MSD values in Table 34 apply.

Based on simulation results explained in First Example of the Disclosure of the Present Specification, MSD levels are proposed as the following:

For cross-band isolation issue of PC2 NR inter-band CA UE, the MSD values in Table 30 are proposed; and For IMD problem by dual uplink transmission, the MSD values in Table 34 are proposed.

Figure 14:
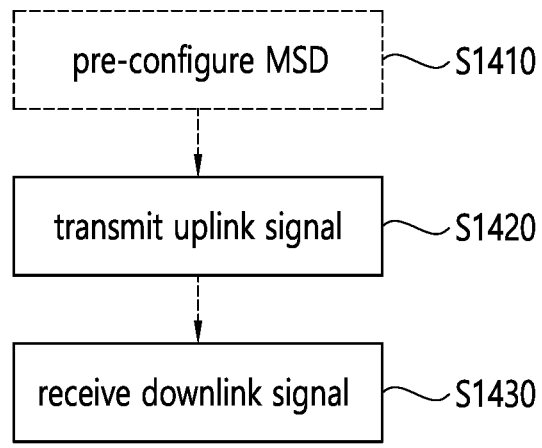
FIG. 14 is a flow chart showing an example of a procedure of a UE according to the present disclosure.

Hereinafter, FIG. 14 illustrates an example of an operation performed by the UE.

The following drawings are prepared to explain a specific example of the present specification. Since the names of specific devices or names of specific signals/messages/fields described in the drawings are provided by way of example, technical features of the present specification are not limited to specific names used in the following drawings.

FIG. 14 is a flow chart showing an example of a procedure of a UE according to the present disclosure.

Referring to FIG. 14, steps S1410 to S1430 are shown. Operations described below may be performed by the UE (for example, the first device 100 of FIG. 2).

For reference, step S1410 may not always be performed when the UE performs communication. For example, step S1410 may be performed only when the reception performance of the UE is tested.

In the UE performing the operation of FIG. 14, DC or CA may be configured.

For example, the PC2 NR inter-band CA based on the combination of two NR operating bands may be configured. For example, the combination of two NR operating bands may be the various EN-DC band combinations in Table 30 based on that the UE is power class 2 UE. For example, the combination of two NR operating bands may be the various EN-DC band combinations in Table 34 based on that the UE is power class 2 UE.

For example, the EN-DC based on the combination of one E-UTRA operating band and one NR operating band may be configured. For example, the combination of one E-UTRA operating band and one NR operating band may be the various EN-DC band combinations in Table 21 based on that the UE is power class 2 UE. For example, the combination of one E-UTRA operating band and one NR operating band may be the various EN-DC band combinations in Table 25 based on that the UE is power class 2 UE.

In step S1410, the UE may preconfigure the MSD value. For example, the UE may preset the MSD values in Table 21, Table 25, Table 30 and/or Table 34.

In step S1420, the UE may transmit the uplink signal.

In step S1430, the UE may receive the downlink signal.

The UE may receive the downlink signal based on the reference sensitivity of the downlink band, to which the MSD value (for example, MSD values shown in examples of Table 21, Table 25, Table 30 and/or Table 34) is applied.

For example, the UE may be configured to use CA based on 2 NR operating bands. The two NR operating bands may be two bands among NR operating bands n2, n5, n25, n41, n66, n71 or n77.

For example, the UE may transmit uplink signal via one NR operating band among the two NR operating bands. The UE may receive downlink signal on other NR operating band, different from the one NR operating band, among the two NR operating bands. For example, MSD value due to cross band isolation, which is shown in examples of Table 30, may be applied to a reference sensitivity for receiving the downlink signal based on a combination of NR operating band used for downlink band and NR operating band used for uplink band. For example, as shown in examples of Table 30, the MSD value is pre-configured according to a combination of the two NR operating bands used for the CA, and channel bandwidth configured for the downlink signal, based on that the UE is power class 2 UE.

For example, the MSD value may be 6.5 dB, based on that the NR operating band, used for uplink band, is n77, the other NR operating band, used for downlink band, is n41, and the channel bandwidth configured for the downlink signal is one of 10 MHz, 15 MHz, or 20 MHz. For example, based on that the one NR operating band is n41, the other NR operating band is n77: wherein the MSD value may be 10.5 dB, based on that the channel bandwidth configured for the downlink signal is one of 10 MHz, 15 MHz, or 20 MHz; wherein the MSD value may be 9.5 dB, based on that the channel bandwidth configured for the downlink signal is 25 MHz; wherein the MSD value may be 8.6 dB, based on that the channel bandwidth configured for the downlink signal is 30 MHz; wherein the MSD value may be 8.3 dB, based on that the channel bandwidth configured for the downlink signal is 40 MHz; wherein the MSD value may be 7.2 dB, based on that the channel bandwidth configured for the downlink signal is 50 MHz; wherein the MSD value may be 6.3 dB, based on that the channel bandwidth configured for the downlink signal is one of 60 MHz; wherein the MSD value may be 6.0 dB, based on that the channel bandwidth configured for the downlink signal is 70 MHz; wherein the MSD value may be 5.7 dB, based on that the channel bandwidth configured for the downlink signal is 80 MHz; and wherein the MSD value may be 5.6 dB, based on that the channel bandwidth configured for the downlink signal is one of 90 MHz or 100 MHz.

For MSD due to dual uplink operation, the UE may transmit the uplink signal via two NR operating bands. The MSD value due to dual uplink operation, as shown in examples of Table 34, is applied to the reference sensitivity for receiving the downlink signal based on a combination of the two NR operating bands, based on that the UE is the power class 2 UE. The MSD value may be 32.1 dB for 2nd Intermodulation Distortion (IMD), based on that the two NR operating bands are n2 and n77, and the other NR operating band is n2. The MSD value may be 19.1 dB for 4th IMD, based on that the two NR operating bands are n2 and n77, and the other NR operating band is n2. The MSD value may be 18.6 dB, based on that the two NR operating bands are n5 and n77, and the other NR operating band is n5. The MSD value may be 16.3 dB, based on that the two NR operating bands are n41 and n77, and the other NR operating band is n41. The MSD value may be 34.33 dB for 2nd IMD, based on that the two NR operating bands are n66 and n77, and the other NR operating band is n66. The MSD value may be 11.27 dB for 5th IMD, based on that the two NR operating bands are n66 and n77, and the other NR operating band is n66. The MSD value may be 11.4 dB, based on that the two NR operating bands are n71 and n77, and the other NR operating band is n71.

For example, the UE, which is power class 2 UE, may be configured to use EN-DC based on one NR operating band and one E-UTRA operating band. The NR operating bands may be one among NR operating bands n41, n77, or n78. The one E-UTRA operating band is one among E-UTRA operating bands 2, 5, 7, 13, or 66.

For example, the UE may transmit uplink signal via the one NR operating band. The UE may receive downlink signal via the one E-UTRA operating band. For example, MSD value due to cross band isolation, which is shown in examples of Table 21, may be applied to a reference sensitivity for receiving the downlink signal based on a combination of E-UTRA operating band used for downlink band and NR operating band used for uplink band. For example, as shown in examples of Table 21, the MSD value may be pre-configured according to a combination of the one NR operating band, the one E-UTRA operating band, and channel bandwidth configured for the downlink signal, based on that the UE is power class 2 UE. For example, wherein the MSD value may be 6.4 dB, based on that the one NR operating band is n78, the one E-UTRA operating band is 7, and the channel bandwidth configured for the downlink signal is one of 5 MHz, 10 MHz, 15 MHz, or 20 MHz. wherein the MSD value may be 1.6 dB, based on that the one NR operating band is n41, the one E-UTRA operating band is 2, and the channel bandwidth configured for the downlink signal is one of 5 MHz, 10 MHz, 15 MHz, or 20 MHz. The MSD value may be 5.4 dB, based on that the one NR operating band is n41, the one E-UTRA operating band is 66, and the channel bandwidth configured for the downlink signal is one of 5 MHz, 10 MHz, 15 MHz, or 20 MHz.

For MSD due to dual uplink operation, the UE may transmit the uplink signal the one NR operating band and the one E-UTRA operating band. The MSD value due to dual uplink operation, as shown in examples of Table 25, is applied to the reference sensitivity for receiving the downlink signal based on a combination of the one NR operating band and the one E-UTRA operating band, based on that the UE is the power class 2 UE. For example, wherein the MSD value may be 32.1 dB for 2nd Intermodulation Distortion (IMD), based on that the one NR operating band is n77 and the one E-UTRA operating band is 2. The MSD value may be 19.1 dB for 4th IMD, based on that the one NR operating band is n77 and the one E-UTRA operating band is 2. The MSD value may be 18.6 dB, based on that the one NR operating band is n77 and the one E-UTRA operating band is 5. The MSD value may be 15.37 dB, based on that the one NR operating band is n77 and the one E-UTRA operating band is 13. The MSD value may be 34.33 dB for 2nd IMD, based on that the one NR operating band is n77 and the one E-UTRA operating band is 66. The MSD value may be 11.27 dB for 5th IMD, based on that the one NR operating band is n77 and the one E-UTRA operating band is 66.

For reference, the order in which steps S1720 and S1730 are performed may be different from that shown in FIG. 14. For example, step S1730 may be performed first and then step S1720 may be performed. Alternatively, step S1720 and step S1730 may be performed simultaneously. Alternatively, the time when step S1720 and step S1730 may be may overlap partially.

Hereinafter, an apparatus(for example, UE) in a wireless communication system, according to some embodiments of the present disclosure, will be described.

For example, the apparatus may include at least one processor, at least one transceiver, and at least one memory.

For example, the at least one processor may be configured to be coupled operably with the at least one memory and the at least one transceiver. The apparatus and/or the at least one transceiver may be configured to use Carrier Aggregation (CA) based on two New Radio (NR) operating bands. The two NR operating bands are two bands among NR operating bands n2, n5, n25, n41, n66, n71 or n77

For example, the processor may be configured to transmit, via the at least one transceiver an uplink signal via one NR operating band among the two NR operating bands; and receiving, via the at least one transceiver, a downlink signal on other NR operating band, different from the one NR operating band, among the two NR operating bands, wherein Maximum Sensitivity Degradation (MSD) value due to cross band isolation is applied to a reference sensitivity for receiving the downlink signal based on the other NR operating band, and wherein the MSD value is pre-configured according to a combination of the one NR operating band, the other NR operating band, and channel bandwidth configured for the downlink signal, based on that the UE is power class 2 UE.

Hereinafter, a processor for in a wireless communication system, according to some embodiments of the present disclosure, will be described.

For example, the processor may be configured to use CA based on two NR operating bands. The two NR operating bands may be two bands among NR operating bands n2, n5, n25, n41, n66, n71 or n77. the processor may be configured to generate an uplink signal via one NR operating band among the two NR operating bands; and identify a downlink signal on other NR operating band, different from the one NR operating band, among the two NR operating bands, wherein MSD value due to cross band isolation may be applied to a reference sensitivity for receiving the downlink signal based on the other NR operating band, and wherein the MSD value may be pre-configured according to a combination of the one NR operating band, the other NR operating band, and channel bandwidth configured for the downlink signal, based on that a device including the at least one processor is power class 2 UE.

Hereinafter, a non-transitory computer-readable medium has stored thereon a plurality of instructions in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a UE.

For example, the stored a plurality of instructions may cause the UE to generate an uplink signal via one New Radio (NR) operating band among two NR operating bands. Wherein the at least one processor is configured to use Carrier Aggregation (CA) based on the two NR operating bands. Wherein the two NR operating bands are two bands among NR operating bands n2, n5, n25, n41, n66, n71 or n77. The stored a plurality of instructions may cause the UE to identify a downlink signal on other NR operating band, different from the one NR operating band, among the two NR operating bands. MSD value due to cross band isolation may be applied to a reference sensitivity for receiving the downlink signal based on the other NR operating band. The MSD value may be pre-configured according to a combination of the one NR operating band, the other NR operating band, and channel bandwidth configured for the downlink signal, based on that a device including the at least one processor is power class 2 UE.

According to some embodiment of the present disclosure, the impact of self interference, such as harmonics and/or Intermodulation Distortion (IMD), on some E-UTRA NR Dual Connectivity (EN-DC) band combinations and on some inter-band Carrier Aggregation (CA) band combinations for power class 2 are clearly analyzed. Also MSD values applied to reference sensitivity for receiving the downlink signal are clearly analyzed. Thus, the power class 2 UE configured with the EN-DC and/or inter-band CA may perform communication efficiently and/or precisely.

According to some embodiment of the present disclosure, for power class 2 UE, the impact of cross band isolations, which means interference on Rx(reception) band due to small frequency interval between Tx(Transmission) carrier/frequency in band X and the Rx carrier/frequency in band Y, on some EN-DC band combinations and on some inter-band CA band combinations are clearly analyzed. Also MSD values applied to reference sensitivity for receiving the downlink signal are clearly analyzed. Thus, the power class 2 UE configured with the EN-DC and/or inter-band CA may perform communication efficiently and/or precisely.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A User Equipment (UE) in a wireless communication system, the UE comprising:
at least one transceiver,
wherein the at least one transceiver configured to use Carrier Aggregation (CA) based on two New Radio (NR) operating bands,
wherein the two NR operating bands are NR operating bands n41 and n77;
at least one processor; and
at least one computer memory operably connectable to the at least one processor and storing instructions that, based on being executed by the at least one processor, perform operations comprising:
transmitting, via the at least one transceiver, an uplink signal based on one NR operating band of the two NR operating bands; and
receiving, via the at least one transceiver, a downlink signal based on other NR operating band, different from the one NR operating band, of the two NR operating bands,
wherein Maximum Sensitivity Degradation (MSD) value due to cross band isolation is allowed to a reference sensitivity for receiving the downlink signal based on the other NR operating band,
wherein the MSD value is based on a combination of the one NR operating band, the other NR operating band, and channel bandwidth for the downlink signal, based on that the UE is power class 2 UE, and
wherein the MSD value is 6.5 dB, based on that the one NR operating band is n77, the other NR operating band is n41, and the channel bandwidth for the downlink signal is 10 MHz.

2. The UE of claim 1, based on that the one NR operating band is n41, the other NR operating band is n77:
wherein the MSD value is 10.5 dB, based on that the channel bandwidth configured for the downlink signal is 10 MHz.

3. The UE of claim 1,
wherein the uplink signal is transmitted via the two NR operating bands, and
wherein MSD value due to dual uplink operation is allowed to the reference sensitivity for receiving the downlink signal based on a combination of the two NR operating bands, based on that the UE is the power class 2 UE.

4. A method for performing communication, the method performed by a User Equipment (UE) and comprising:
transmitting an uplink signal based on one New Radio (NR) operating band of two NR operating bands,
wherein the UE is configured to use Carrier Aggregation (CA) based on the two NR operating bands,
wherein the two NR operating bands are NR operating bands n41 and n77; and
receiving a downlink signal based on other NR operating band, different from the one NR operating band, of the two NR operating bands,
wherein Maximum Sensitivity Degradation (MSD) value due to cross band isolation is allowed to a reference sensitivity for receiving the downlink signal based on the other NR operating band,
wherein the MSD value is based on a combination of the one NR operating band, the other NR operating band, and channel bandwidth for the downlink signal, based on that the UE is power class 2 UE, and
wherein the MSD value is 6.5 dB, based on that the one NR operating band is n77, the other NR operating band is n41, and the channel bandwidth for the downlink signal is 10 MHz.

5. The method of claim 4,
based on that the one NR operating band is n41, the other NR operating band is n77:
wherein the MSD value is 10.5 dB, based on that the channel bandwidth configured for the downlink signal is 10 MHz.

6. A User Equipment (UE) in a wireless communication system, the UE comprising:
at least one transceiver,
wherein the at least one transceiver is configured to use Evolved Universal Terrestrial Radio Access (E-UTRA) New Radio (NR) Dual Connectivity (EN-DC), based on one E-UTRA operating band and one NR operating band,
wherein the one NR operating band is one among NR operating bands n41, n77, or n78, and
wherein the one E-UTRA operating band is one among E-UTRA operating bands 2, 5, 7, 13, or 66;
at least one processor; and
at least one computer memory operably connectable to the at least one processor and storing instructions that, based on being executed by the at least one processor, perform operations comprising:
transmitting, via the at least one transceiver, an uplink signal via the one NR operating band; and
receiving, via the at least one transceiver, a downlink signal via the one E-UTRA operating band,
wherein Maximum Sensitivity Degradation (MSD) value due to cross band isolation is allowed to a reference sensitivity for receiving the downlink signal based on the one E-UTRA operating band,
wherein the MSD value is based on a combination of the one NR operating band, the one E-UTRA operating band, and channel bandwidth for the downlink signal, based on that the UE is power class 2 UE,
wherein the MSD value is 6.4 dB, based on that the one NR operating band is n78, the one E-UTRA operating band is 7, and the channel bandwidth for the downlink signal is one of 5 MHz, 10 MHz, 15 MHz, or 20 MHz,
wherein the MSD value is 1.6 dB, based on that the one NR operating band is n41, the one E-UTRA operating band is 2, and the channel bandwidth for the downlink signal is one of 5 MHz, 10 MHz, 15 MHz, or 20 MHz, and
wherein the MSD value is 5.4 dB, based on that the one NR operating band is n41, the one E-UTRA operating band is 66, and the channel bandwidth for the downlink signal is one of 5 MHz, 10 MHz, 15 MHz, or 20 MHz.

7. The UE of claim 6,
wherein the uplink signal is transmitted via the one NR operating band and the one E-UTRA operating band, and
wherein MSD value due to dual uplink operating is allowed to the reference sensitivity for receiving the downlink signal based on a combination of one NR operating band and the one E-UTRA operating band, based on that the UE is the power class 2 UE.

8. The UE of claim 7,
wherein the MSD value is 32.1 dB for $2^{nd}$ Intermodulation Distortion (IMD), based on that the one NR operating band is n77 and the one E-UTRA operating band is 2, wherein the MSD value is 19.1 dB for $4^{th}$ IMD, based on that the one NR operating band is n77 and the one E-UTRA operating band is 2, wherein the MSD value is 18.6 dB, based on that the one NR operating band is n77 and the one E-UTRA operating band is 5, wherein the MSD value is 15.37 dB, based on that the one NR operating band is n77 and the one E-UTRA operating band is 13, wherein the MSD value is 34.33 dB for $2^{nd}$ IMD, based on that the one NR operating band is n77 and the one E-UTRA operating band is 66, and wherein the MSD value is 11.27 dB for $5^{th}$ IMD, based on that the one NR operating band is n77 and the one E-UTRA operating band is 66.

* * * * *